US008612073B2

(12) United States Patent
Fuji et al.

(10) Patent No.: US 8,612,073 B2
(45) Date of Patent: Dec. 17, 2013

(54) ELECTRIC VEHICLE INVERTER APPARATUS AND PROTECTION METHOD THEREFOR

(75) Inventors: Kiyotaka Fuji, Fukuoka (JP); Hidenori Hara, Fukuoka (JP); Kenji Yamada, Fukuoka (JP); Yoshinori Tanaka, Fukuoka (JP); Akihiro Furukawa, Hiroshima (JP); Hirofumi Ebisumoto, Hiroshima (JP); Kei Yonemori, Hiroshima (JP); Nobuhide Seo, Hiroshima (JP); Ryuichiro Amano, Hiroshima (JP)

(73) Assignees: Kabushiki Kaisha Yaskawa Denki, Fukuoka (JP); Mazda Motor Corporation, Hiroshima (JP)

( * ) Notice: Subject to any disclaimer, the term of this patent is extended or adjusted under 35 U.S.C. 154(b) by 973 days.

(21) Appl. No.: 12/708,566

(22) Filed: Feb. 19, 2010

(65) Prior Publication Data

US 2010/0214055 A1 Aug. 26, 2010

(30) Foreign Application Priority Data

Feb. 20, 2009 (JP) ................................ 2009-038271

(51) Int. Cl.
*B60L 11/08* (2006.01)

(52) U.S. Cl.
USPC ............................ 701/22; 307/10.1; 320/166

(58) Field of Classification Search
USPC .......... 701/22, 36; 340/3.1, 3.4, 3.8; 361/135, 361/136, 212, 220; 180/65.21, 65.275, 180/65.8; 307/10.1, 104
See application file for complete search history.

(56) References Cited

U.S. PATENT DOCUMENTS

| | | | | |
|---|---|---|---|---|
| 7,057,361 | B2 * | 6/2006 | Kitahata et al. | 318/139 |
| 7,649,335 | B2 * | 1/2010 | Ishikawa et al. | 320/104 |
| 7,697,310 | B2 * | 4/2010 | Nakamura et al. | 363/127 |
| 8,362,754 | B2 * | 1/2013 | Maebara et al. | 323/282 |
| 8,415,825 | B2 * | 4/2013 | Hirose | 307/9.1 |
| 8,432,648 | B2 * | 4/2013 | Fukuyama et al. | 361/23 |
| 8,441,224 | B2 * | 5/2013 | Sumi et al. | 318/801 |
| 8,446,116 | B2 * | 5/2013 | Fukuta et al. | 318/400.27 |

(Continued)

FOREIGN PATENT DOCUMENTS

| | | |
|---|---|---|
| CN | 1833921 A | 9/2006 |
| CN | 101025436 A | 8/2007 |

(Continued)

OTHER PUBLICATIONS

Communication dated Mar. 26, 2013 from the Japanese Patent Office in counterpart Japanese application No. 2009-038271.

(Continued)

*Primary Examiner* — Katy M Ebner
*Assistant Examiner* — Emma K Frick
(74) *Attorney, Agent, or Firm* — Sughrue Mion, PLLC

(57) ABSTRACT

In an electric vehicle inverter apparatus 100, a vehicle control controller 15 detects a switch open signal output from a collision detector 16 when the collision detector 16 is caused by a collision between electric vehicles to operate. Then, an inverter main circuit connection switch 10 of a high-voltage battery unit 8 is put into an open state. Thus, the direct-current power supply from a high-voltage battery 12 to a DC bus portion is interrupted. In addition, electric charges charged into a main circuit capacitor 7 are discharged by a forced discharge circuit portion **22*b*.**

17 Claims, 15 Drawing Sheets

(56) References Cited

U.S. PATENT DOCUMENTS

| | | | | |
|---|---|---|---|---|
| 2010/0213904 | A1* | 8/2010 | Yamada | 320/166 |
| 2011/0133547 | A1* | 6/2011 | Song et al. | 307/9.1 |
| 2011/0278918 | A1* | 11/2011 | Shindo et al. | 307/9.1 |
| 2012/0055727 | A1* | 3/2012 | Omiya et al. | 180/279 |
| 2012/0062029 | A1* | 3/2012 | Fukuyama et al. | 307/10.1 |
| 2012/0320649 | A1* | 12/2012 | Hamanaka et al. | 363/131 |
| 2013/0015802 | A1* | 1/2013 | Hirose | 318/488 |

FOREIGN PATENT DOCUMENTS

| | | | | |
|---|---|---|---|---|
| JP | 06-276610 | A | | 9/1994 |
| JP | 2003-235241 | A | | 8/2003 |
| JP | 2006 224772 | | * | 8/2006 |
| JP | 2006224772 | A | | 8/2006 |
| JP | 2006-322792 | | * | 11/2006 |
| JP | 2006304551 | A | | 11/2006 |
| JP | 2006322792 | A | | 11/2006 |

OTHER PUBLICATIONS

Office Action issued by the State Intellectual Properly Office of the People's Republic of China on May 30, 2013 in correspondence to Application No. 201010114364.4.

* cited by examiner

ELECTRIC VEHICLE INVERTER APPARATUS AND PROTECTION METHOD THEREFOR

CROSS-REFERENCE TO RELATED APPLICATION

This application is based on and claims priority under 35 U.S.C. §119 from Japanese Patent Application No. 2009-038271 filed on Feb. 20, 2009.

BACKGROUND OF THE INVENTION

1. Technical Field

The present invention relates to a protection circuit and method for an inverter apparatus which is an electric vehicle semiconductor power conversion apparatus mounted in an electric car, a hybrid car, or the like.

2. Related Art

An electric vehicle inverter apparatus is connected to a high-voltage battery unit that incorporates an inrush current suppression function and a high-voltage interrupting function and that has a voltage of hundreds of volts (V). Even when the high-voltage battery unit is disconnected therefrom, a high voltage remains in a main circuit capacitor. Countermeasures for preventing occurrence of electric shock during maintenance and in impact accidents are important from the viewpoint of safety enhancement. As one of the countermeasures, a discharge resistance or a discharge circuit has hitherto been installed in a high-voltage portion of the inverter apparatus.

FIG. 11 illustrates a discharge circuit according to Conventional Example 1 of an electric motor driving apparatus disclosed in Patent Document 1.

<Operation of Discharge Circuit Disclosed in Patent Document 1>

<<At Start-Up of Motor>>

As illustrated in FIG. 11, when a direct-current (DC) brushless motor M starts up (i.e., a power supply circuit is in an on-state), a controller 62 puts the contacts of a power supply relay Ry1 into an open state (off-state), and brings those of a charge relay Ry2 into a closed state (on-state), respectively. In addition, the controller 62 puts the contacts of a normally-closed type relay Ry3 into an open state (off-state). In this condition, electric current flowing in a discharge resistor R1 is interrupted by the contacts of the normally-closed type relay Ry3. Accordingly, electric charges are stored in a smoothing capacitor C through a charge resistor R2. That is, the smoothing capacitor C is charged. At that time, the charge resistor R2 is interposed between a power supply and the smoothing capacitor C. Thus, inrush current is prevented from flowing into the smoothing capacitor C.

<<During Operation of Motor>>

The controller 62 puts the contacts of the power supply relay Ry1 into a closed state (on-state) and brings those of the charge relay Ry2 into an open state (off-state). Consequently, the DC brushless motor M is operated by an inverter 61 of the power supply circuit at a predetermined rotational speed in a stable operation state.

<<At Stoppage of Motor>>

On the other hand, when the DC brushless motor M is stopped (i.e., the power supply circuit is in an off-state), the controller 62 puts the contacts of the power supply relay Ry1 and those of the charge relay Ry2 into an open state (off-state). In addition, the controller 62 brings the normally-closed type relay Ry3 into a closed state (on-state). In this state, electric charges stored in the smoothing capacitor C flow through the charge resistor R1 and the normally-closed type relay Ry3. Consequently, the smoothing capacitor C is discharged.

FIG. 12 illustrates a discharge circuit according to Conventional Example 2 of a power supply apparatus for a DC-DC converter or the like disclosed in Patent Document 2.

<Configuration of Discharge Circuit Disclosed in Patent Document 2>

<<Discharge Current Control Portion DL>>

As illustrated in FIG. 12, a discharge current control portion DL is constituted by a series circuit of a discharge resistor R1 and a switching element Q1. The on/off control of an electric current path between an output terminal Out and a ground point switching element Q1 is performed by turning on and off the switching element Q1. Thus, the on/off control of electric current flowing in the discharge resistor R1 can be performed.

<<Charge Storage Portion CS>>

An electric charge storage portion CS is constituted by a diode D11 serving as a rectifying element, and a capacitor C11 serving as a charge storage means. The anode of a diode D11 is connected to an output terminal Out, while the cathode of the diode D11 is connected to one of the electrodes of the capacitor C11 so that the other electrode of the capacitor C11 is connected to the ground point. The connection point between the diode D11 and the capacitor C11 is connected to a discharge control portion DC as a charge storage portion output terminal CST. With this circuit configuration, a voltage substantially the same as an output voltage can be maintained at the charge storage portion output terminal CST which is one of the terminals of the capacitor C11. Thus, this voltage is supplied to the discharge control portion DC as a control portion power supply voltage.

<<Discharge Control Portion DC>>

The discharge control portion DC is constituted by a series circuit of a transistor Q12, and resistors R16 and R17 connected between the charge storage portion output terminal CST and a ground point, and resistors R18 and R19 for performing the on/off control of the transistor Q12 by applying a bias to an input terminal (base electrode in this case) of the transistor Q12. One of the terminals of the resistor R18 is connected to the charge storage portion output terminal CST. The connection point between the resistors R18 and R19 is connected to the input terminal of the transistor Q12. The resistor R19 is connected to an input voltage detection portion ID. An input detection signal output from the input voltage detection portion ID is applied to the input terminal of the transistor Q12 as an input signal.

<<Input Voltage Detection Portion ID>>

FIG. 13 is a circuit diagram illustrating the input voltage detection portion ID shown in FIG. 12. As illustrated in FIG. 13, a series circuit of resistors R21 and R22, a series circuit of a resistor R23 and a zener diode ZD21, a power supply terminal of an operational amplifier AMP, and a series circuit of a resistor R25 and a transistor Q21 are connected between an input terminal In and a ground point. In addition, an output terminal of the operational amplifier AMP and one of the terminals of a resistor R24 connected to the input terminal In at the other terminal thereof are connected to the input terminal of the transistor Q21. The connection point between the resistors R21 and R22 is connected to the negative input terminal of the operational amplifier AMP, while the connection point between the resistor R23 and the zener diode ZD21 is connected to the positive input terminal of the operational amplifier AMP.

<<Operation 1 of Input Voltage Detection Portion ID: Output of Logical H Signal in Steady State>>

In a steady state, the voltage of the input terminal In is an input voltage itself and has a logical HIGH level. At that time, a zener diode ZD21 is tuned on. A voltage at the positive input terminal of an operational amplifier AMP is the zener voltage of the zener diode ZD21. On the other hand, a voltage obtained by voltage division with the resistors R21 and R22 is applied to the negative input terminal of the operational amplifier AMP. This voltage is set to be higher than the zener voltage. When the potential at the negative input terminal of the operational amplifier AMP is higher than that at the positive input terminal thereof, the output of the operational amplifier AMP is at a logical LOW level. Thus, the transistor Q21 is turned off. No current flows in a resistor R25 because the transistor Q21 is off. The input voltage detection portion ID outputs a signal, whose level is a logical HIGH level, to the discharge control portion DC as an input detection signal. That is, in a steady state, a signal whose level is a logical HIGH level is output from the input voltage detection portion ID.

<<Operation 2 of Input Voltage Detection Portion ID: Output of Logical L Signal at Trailing Edge Time>>

At a trailing edge time, in a case where the voltage at the input terminal In is lowered to be equal to or lower than the zener voltage of the zener diode ZD21, the potential at the positive input terminal of the operational amplifier AMP is the voltage at the input terminal In. On the other hand, the potential at the negative input terminal of the operational amplifier AMP is lower than the voltage at the input terminal In, because the voltage at the input terminal In is subjected to voltage division through the resistors R21 and R22. When the potential at the positive input terminal of the operational amplifier AMP is higher than that at the negative input terminal thereof, the output of the operational amplifier AMP has a logical HIGH level. Thus, the transistor Q21 is turned on. Electric current flows in the resistor R25, because the transistor Q21 is on. The input voltage detection portion ID outputs a signal, whose level is a logical LOW level, to the discharge control portion DC as an input detection signal. That is, at a trailing edge time, a signal whose level is a logical LOW level is output from the input voltage detection portion ID.

<Operation of Discharge Circuit Disclosed in Patent Document 2>

In a steady state in which the output voltage at the output terminal Out is maintained at a rated voltage, the input voltage to the input terminal In is substantially equal to the rated voltage. Thus, the input voltage detection portion ID outputs a signal whose level is a logical HIGH level (or off-signal (hereinafter represented by a logical level)) as an input detection signal to a terminal of the resistor R19, which is the input terminal of the discharge control portion DC. Because the transistor Q12 is turned off by inputting a logical HIGH level signal to the discharge control portion DC, an output of the discharge control portion DC is a logical LOW level signal (signal having a level equal to ground potential, or no signal). Accordingly, the input terminal of the switching element Q1 is at a ground level. Thus, the switching element Q1 is turned off. No discharge current flows in the discharge resistor R1. That is, in a steady state, the discharge current control portion DL feeds no discharge current.

That is, the discharge circuit according to Conventional Example 2 in FIG. 12 and FIG. 13 performs the on/off control of the switching element Q1 of the discharge current control portion DL and the discharge control via the discharge resistor R1, based on a control portion power supply voltage and an input detection signal, by detecting an input voltage with an input voltage detection portion ID connected to an input terminal, and by outputting to the discharge control portion DC an input detection signal according to the input voltage.

Referring next to FIG. 14, there is shown a discharge circuit according to Conventional Example 3.

<<Discharge Circuit according to Conventional Example 3>>

As illustrated in FIG. 14, the discharge circuit is configured so that when a discharge command signal FD1 is input to a photocoupler 36 of an insulation circuit, a gate drive PNP transistor 42 is turned on, that a gate drive voltage Vc1 is applied to a gate of a power metal-oxide semiconductor field-effect transistor (MOSFET) 40 via resistors 43 and 41, that thus, the power MOSFET 40 is turned on, and that a discharge operation is performed via a discharge resistor 39. The gate power supply circuit portion 30 has a resistor 31 connected to the positive terminal P of a high-voltage capacitor, a zener diode 33 which generates the gate drive voltage Vc1 and is connected to the negative terminal N of the high-voltage capacitor, and an electrolytic capacitor 34 which stores electric charges corresponding to a voltage developed across the zener diode 33 and supplies a gate drive power supply voltage.

<<Discharge Circuit according to Conventional Example 4>>

FIG. 15 illustrates a discharge circuit according to Conventional Example 4 in a case where an overheat protection circuit for a discharge circuit is added to the discharge circuit illustrated in FIG. 14.

As illustrated in FIG. 15, the discharge circuit is featured in that a forced discharge circuit portion 22*a* is provided with an overheat protection portion 28 for protecting a discharge resistor 39 from being overheated, so that the overheat protection portion 28 is disposed between the connection point of a gate resistor 41 of a power MOSFET 40 and the collector of a gate drive PNP transistor 42 and the negative terminal N of a high-voltage capacitor. A discharge current is detected by the voltage drop across a detection resistor 51. When an NPN transistor 47 is turned on by applying a voltage to the base of the NPN transistor 47, the base of a PNP transistor 46 is connected to a voltage of 0V of the gate power supply circuit portion 30. At that time, the emitter-collector junction of the PNP transistor 46 conducts to apply a base drive voltage to the base of the NPN transistor 47. Thus, the NPN transistor 47 maintains an on-state. In addition, the gate voltage of the power MOSFET 40 is dropped to 0V. Consequently, the power MOSFET 40 is turned off, and the discharge current is interrupted.

An operation of turning off the gate voltage is continued in the aforementioned manner. Accordingly, the discharge resistor 39 is protected from being overheated by performing a discharge operation in a high-voltage applied state.

[Patent Document 1] JP-A-6-276610 (page 4, and FIG. 1)

[Patent Document 2] JP-A-2003-235241 (Pages 6 to 7, and FIGS. 2 and 4)

<Drawbacks of Conventional Discharge Circuit>

However, the high-voltage discharge circuit of the aforementioned conventional electric vehicle inverter apparatus is configured to constantly perform discharge. Accordingly, the discharge resistor is large in size. The deterioration of the mountability of the inverter apparatus to a vehicle and the increase in the manufacturing cost thereof occur due to the increase in the required space and the weight thereof.

In a case where the method of cooling the inverter apparatus is implemented by the air-cooling of the discharge resistor, when an electric vehicle runs at low speed, the cooling capability is reduced. Thus, at worst, the discharge resistor may be put into a burnout state. Consequently, it is indispensably necessary to install the inverter apparatus at a water-cooling portion of the vehicle. However, the conventional discharge circuit has a problem that accordingly, the mountability of the inverter apparatus to a vehicle is more deteriorated.

<<Drawbacks of Discharge Circuit according to Patent Document 1>>

In the discharge circuit of the configuration according to Conventional Example 1 illustrated in FIG. 11, which is disclosed in Patent Document 1, the normally closed type relay Ry3 is turned on after the power supply relay Ry1 and the charge relay Ry2 are opened. Thus, the high voltage of the smoothing capacitor C is discharged with the discharge resistor R1. At that time, in a case where an on-failure occurs in an excitation operation transistor of the power supply relay Ry1 or the charge relay Ry2, the excitation state of the power supply relay Ry1 or Ry2 is maintained. Thus, a high-voltage power supply Vdc remains connected to the discharge resistor R1. Consequently, the discharge circuit according to Patent Document 1 has a problem that the overheat destruction of the discharge resistor R1 is caused. The discharge circuit according to Patent Document 1 has another problem that in a case where the power supply relay Ry1 or the charge relay Ry2 is normally opened, even when the DC brushless motor M performs a regeneration operation or continues rotation, electric current continues to constantly flow in the discharge resistor R1, so that the discharge resistor R1 overheats.

<<Drawbacks of Discharge Circuit according to Patent Document 2>>

In the discharge circuit of the configuration according to Conventional Example 2 illustrated in FIGS. 12 and 13, which is disclosed in Patent Document 2, the input voltage and the output voltage are uninsulated from each other. A zero-volt line is shared by the input-terminal side and the output-terminal side. Thus, the discharge control is performed at the output side using input voltage detection information. On the other hand, in the inverter apparatus having the high voltage portion, the circuit control portion and the detection control portion are operated by the power supply circuit using a low-voltage battery, and thus cannot be configured to have the same potential as that of the high voltage portion. Consequently, the inverter apparatus provided with the high voltage portion using the discharge circuit according to Patent Document 2 has a problem that an insulation circuit is indispensably required.

<<Drawbacks of Discharge Circuit according to Conventional Example 3>>

The discharge circuit of the configuration according to Conventional Example 3 illustrated in FIG. 14 has the following problems. That is, there is a fear of occurrence of a state, in which a discharge operation is not completed, according to the signal state of the discharge command signal FD1, due to, e.g., chattering or the interruption of the low-voltage battery.

In addition, when a discharge signal is input in a high-voltage applied state, electric current constantly flows in the discharge resistor, so that the discharge resistor is overheated.

Additionally, in the gate power supply circuit portion 30 of the forced discharge circuit portion 22 in FIG. 14, the resistance value of the resistor 31 is set at high value, because the gate power supply voltage is low. Thus, when the inverter apparatus starts up, it takes long time until the apparatus reaches a gate power supply voltage at which a discharge operation can be performed.

<<Drawbacks of Discharge Circuit according to Conventional Example 4>>

In the discharge circuit of the configuration according to Conventional Example 4 illustrated in FIG. 15, the overheat protection circuit portion 28 is added to the circuit illustrated in FIG. 14 in order to prevent occurrence of the problem of overheat of the discharge resistor 39 illustrated in FIG. 14. Although the gate drive potential can be set at 0V and the discharge operation can be stopped when the overheat protection circuit portion 28 is disposed at such an installation position, the following defects may occur.

That is, because the power supply impedance of the gate power supply circuit portion 30 is high, the voltage of the storage electrolytic capacitor 34 is instantly dropped to 0V. During that, the gate drive PNP transistor 42 may be turned off. Thus, an amount of electric current flowing through the emitter-collector junction of the PNP transistor 46 is 0. The base current of the NPN transistor 47 is 0, so that the NPN transistor 47 is turned off, and that a latched state is canceled. In a case where the terminal voltage Vpn of a main circuit capacitor 7 remains in a high voltage state, and where a discharge command signal FD1 is input, when the storage electrolytic capacitor 34 is charged by the diode 38 via the resistor 31 to a level close to a zener voltage of the zener diode 33 for generating a gate power supply voltage, the PNP transistor 42 is turned on again. Thus, the power MOSFET 40 is turned on. Consequently, a discharge operation is started again. Discharge current flows therefrom via the discharge resistor 39. However, while the high-voltage applied state is continued, the overheat state occurs again. The discharge operation and an operation of stopping the discharge for overheat protection are intermittently repeated. Accordingly, there is a fear that the discharge resistor 39 may finally reach an overheat condition and a burnout state.

SUMMARY OF THE INVENTION

The invention is accomplished in view of such problems. An object of the invention is to provide an inverter apparatus which can prevent occurrence of electric shock or the like in maintenance, particularly, in an electric vehicle collision accident, and which has high reliability and is small in size and weight and excels in mountability to a vehicle and economic efficiency, and to provide a protection method therefor.

To solve the above problems, the invention is implemented by the following configurations and methods.

According to a first aspect of the invention, there is provided an electric vehicle inverter apparatus including:

an inverter portion configured to drive an alternating-current (AC) electric motor mechanically connected to a vehicle drive portion of an electric vehicle;

a converter portion configured to convert electric power generated by the AC electric generator which generates electric power by an engine driving force of the electric vehicle into a DC voltage within predetermined range of voltages;

an inverter controller configured to control the inverter portion and the converter portion;

a main circuit capacitor connected between a positive line and a negative line of DC bus (hereinafter called as DC bus) of the inverter and the converter; and a forced discharge circuit portion configured to discharge electric charges charged into the main circuit capacitor in response to a discharge command signal, direct-current electric power for the inverter portion being supplied from a high-voltage battery unit which includes an inverter main circuit connection switch, a high-voltage battery and an inrush current suppression circuit configured to suppress an inrush current from the high-voltage battery when the inverter main circuit connection switch is thrown and which is connected to the DC bus, control power being supplied from a low-voltage battery unit which includes a low-voltage battery and a switch configured to open and close the low-voltage battery, the electric vehicle inverter apparatus receiving and being controlled according to both of a control signal from a vehicle control controller configured to supervisingly control the electric vehicle and a control signal from a collision detector which is connected between the vehicle control controller and the low-voltage battery and which includes a switch configured to be put into an open state when detecting impact due to a collision of the electric vehicle, wherein the vehicle control controller detects an open signal indicating that a switch of the collision detector is opened when the collision detector is operated by the collision of the electric vehicle;

the vehicle control controller brings the inverter main circuit connection switch of the high-voltage battery unit into an open state, interrupts supply of direct-current electric power of the high-voltage battery to the DC bus portions and outputs a discharge command signal to the forced discharge circuit portion; and the forced discharge circuit portion discharges electric charges charged into the main circuit capacitor.

According to a second aspect of the invention, there is provided the electric vehicle inverter apparatus as in the first aspect, wherein the forced discharge circuit portion includes:

a discharge circuit portion including a discharge resistor, a power semiconductor element, and a discharge current detection resistor, which are series-connected between the DC bus;

a discharge resistor overheat protection circuit portion configured to operate by receiving a voltage generated by voltage drop due to discharge current flowing through the discharge current detection resistor as an input thereto;

a gate power supply circuit portion configured to generate drive power for the power semiconductor element from a direct-current voltage between the DC bus;

a drive circuit portion configured to give a drive signal to a control terminal of the power semiconductor element; and a discharge signal latch circuit portion configured to receive a discharge command signal according to a detection signal from the collision detector and to give a drive signal to the drive circuit portion;

when receiving a discharge command signal according to a detection signal from the collision detector, the discharge signal latch circuit portion maintains an on-signal to the drive circuit portion so that the discharge circuit portion can constantly maintain a discharge operation on-state; and when a terminal voltage of the main circuit capacitor is lowered to a value close to 0 volt by a discharge operation, and when a power supply voltage of the gate power supply circuit portion is lowered to a value which is equal to or lower than an operable voltage of the drive circuit portion, the discharge operation on-state is cancelled.

According to a third aspect of the invention, there is provided the electric vehicle inverter apparatus as in the first aspect, wherein the forced discharge circuit portion includes:

a DC-DC converter configured to convert a battery voltage supplied from the low-voltage battery into an operating voltage of a control circuit portion;

a storage portion configured to store an output voltage of the DC-DC converter;

a discharge operation command input portion configured to input a detection signal from the collision detector and a discharge signal from the vehicle control controller;

a discharge command delay portion configured to prevent occurrence of chattering of the signal input to the discharge operation command input portion;

a discharge signal insulation portion configured to electrically insulate an output signal from the discharge command delay portion; and the storage portion has storage capacity sufficient to an extent that a voltage drop due to interruption of a voltage supplied from the low-voltage battery unit can slightly be delayed on collision of the electric vehicle, and can maintain a power supply voltage at which a control circuit portion is operable until a discharge operation of the forced discharge circuit portion is started up.

According to a fourth aspect of the invention, there is provided the electric vehicle inverter apparatus as in the second aspect, wherein the gate power supply circuit portion includes a resistor and a zener diode series-connected via a diode between the DC bus, and electrolytic capacitors series-connected to each other and parallel-connected to the resistor and the zener diode, respectively; and a zener voltage of the zener diode is higher than an operable voltage of the drive circuit portion, and equal to and lower than an allowable gate voltage of the power semiconductor element.

According to a fifth aspect of the invention, there is provided the electric vehicle inverter apparatus as in the second aspect, wherein a power semiconductor element of the discharge circuit portion includes a MOSFET or an IGBT.

According to a sixth aspect of the invention, there is provided the electric vehicle inverter apparatus as in the second aspect, wherein the drive circuit portion includes:

a first gate resistor connected to a gate of the power semiconductor element including a MOSFET or an IGBT;

a first PNP transistor and a second gate resistor series-connected to the first gate resistor; and a third resistor and a zener diode series-connected to a base of the first PNP transistor;

the discharge signal latch circuit portion is provided at the side of an anode of the zener diode; and the discharge signal latch circuit portion includes an NPN transistor and a PNP transistor, which are connected together as a thyristor.

According to a seventh aspect of the invention, there is provided the electric vehicle inverter apparatus as in the second aspect, wherein the discharge resistor overheat protection circuit portion introduces a terminal voltage of the discharge current detection resistor of the discharge circuit portion to a base of an NPN transistor via a resistor;

a capacitor and a resistor are parallel-connected to each other between a base-emitter junction of the NPN transistor;

a base of a PNP transistor is connected to a collector of the NPN transistor;

a collector of the PNP transistor is connected to a base of the NPN transistor; and an emitter of the PNP transistor is connected to a connection point between the second gate resistor of the drive circuit portion and an emitter of the first PNP transistor.

According to an eighth aspect of the invention, there is provided the electric vehicle inverter apparatus as in the third aspect, wherein the forced discharge circuit portion is configured so that a discharge command latch portion is provided between the discharge command delay portion and the discharge signal insulation portion and maintains a discharge command signal; and the forced discharge circuit portion outputs a discharge state monitoring signal to a vehicle control controller.

According to a ninth aspect of the invention, there is provided the electric vehicle inverter apparatus as in the sixth aspect, wherein the discharge signal latch circuit portion is configured so that an emitter of a single PNP transistor is connected to an anode of the zener diode of the drive circuit portion;

the discharge signal latch circuit portion does not have a function of latching a discharge command signal; and the discharge signal latch circuit portion is configured to receive a discharge command signal preliminarily latched and to cause the drive circuit portion to operate.

According to a tenth aspect of the invention, there is provided the electric vehicle inverter apparatus as in the fourth aspect, wherein the gate power supply circuit portion is configured so that a discharge restart transistor and a discharge restart resistor series-connected to each other are parallel-connected to the zener diode and the electrolytic capacitor parallel-connected to each other; and when receiving a discharge restart signal from a restart command portion of the vehicle control controller just upon completion of a discharge operation, the gate power supply circuit portion turns on the discharge restart transistor and discharges charges charged into the electrolyte capacity.

According to an eleventh aspect of the invention, there is provided the electric vehicle inverter apparatus as in the second aspect, wherein the power semiconductor element of the discharge circuit portion is replaced with a discharge relay;

an excitation winding of the discharging relay is exited by the drive circuit portion;

one of contacts of the discharge relay is connected to the discharge resistor; and the other contact of the discharge relay is connected to the discharge current detection resistor.

According to a twelfth aspect of the invention, there is provided a protection method for an electric vehicle inverter apparatus, the electric vehicle inverter apparatus including:

an inverter portion configured to drive an AC electric motor mechanically connected to a vehicle drive portion of an electric vehicle;

a converter portion configured to convert electric power generated by the AC electric generator which generates electric power by an engine driving force of the electric vehicle into a direct-current voltage within predetermined range of voltages;

an inverter controller configured to control the inverter portion and the converter portion;

a main circuit capacitor connected between DC bus of the inverter and the converter; and a forced discharge circuit portion configured to discharge electric charges charged into the main circuit capacitor in response to a discharge command signal, direct-current electric power for the inverter portion being supplied from a high-voltage battery unit which includes an inverter main circuit connection switch, a high-voltage battery and an inrush current suppression circuit configured to suppress an inrush current from the high-voltage battery when the inverter main circuit connection switch is thrown and which is connected to the DC bus, control power being supplied from a low-voltage battery unit which includes a low-voltage battery and a switch configured to open and close the low-voltage battery, the electric vehicle inverter apparatus receiving and being controlled according to both of a control signal from a vehicle control controller configured to supervisingly control the electric vehicle and a control signal from a collision detector which is connected between the vehicle control controller and the low-voltage battery and which includes a switch configured to be put into an open state when detecting impact due to a collision of the electric vehicle, the protection method including:

detecting, by the vehicle control controller, an open signal indicating that a switch of the collision detector is opened when the collision detector is operated by the collision of the electric vehicle;

bringing, by the vehicle control controller, the inverter main circuit connection switch of the high-voltage battery unit into an open state, interrupting, by the vehicle control controller, supply of direct-current electric power of the high-voltage battery to the DC bus portions, outputting, by the vehicle control controller, a discharge command signal to the forced discharge circuit portion; and discharging, by the forced discharge circuit portion, electric charges charged into the main circuit capacitor.

According to a thirteenth aspect of the invention, there is provided the protection method for an electric vehicle inverter apparatus as in the twelfth aspect, wherein the forced discharge circuit portion includes:

a discharge circuit portion including a discharge resistor, a power semiconductor element, and a discharge current detection resistor, which are series-connected between the DC bus;

a discharge resistor overheat protection circuit portion configured to operate by receiving a voltage generated by voltage drop due to discharge current flowing through the discharge current detection resistor as an input thereto;

a gate power supply circuit portion configured to generate drive power for the power semiconductor element from a direct-current voltage between the DC bus;

a drive circuit portion configured to give a drive signal to a control terminal of the power semiconductor element; and a discharge signal latch circuit portion configured to receive a discharge command signal according to a detection signal from the collision detector and to give a drive signal to the drive circuit portion;

when receiving a discharge command signal according to a detection signal from the collision detector, the discharge signal latch circuit portion maintains an on-signal to the drive circuit portion so that the discharge circuit portion can constantly maintain a discharge operation on-state; and when a terminal voltage of the main circuit capacitor is lowered to a value close to 0 volt by a discharge operation, and when a power supply voltage of the gate power supply circuit portion is lowered to a value which is equal to or lower than an operable voltage of the drive circuit portion, the discharge operation on-state is canceled.

According to a fourteenth aspect of the invention, there is provided the protection method for an electric vehicle inverter apparatus as in the twelfth aspect, wherein the forced discharge circuit portion includes:

a DC-DC converter configured to convert a battery voltage supplied from the low-voltage battery into an operating voltage of a control circuit portion;

a storage portion configured to store an output voltage of the DC-DC converter;

a discharge operation command input portion configured to input a detection signal from the collision detector and a discharge signal from the vehicle control controller;

a discharge command delay portion configured to prevent occurrence of chattering of the signal input to the discharge operation command input portion;

a discharge signal insulation portion configured to electrically insulate an output signal from the discharge command delay portion; and the storage portion has storage capacity sufficient to an extent that a voltage drop due to interruption of a voltage supplied from the low-voltage battery unit can slightly be delayed on collision of the electric vehicle, and can maintain a power supply voltage at which a control circuit portion is operable until a discharge operation of the forced discharge circuit portion is started up.

According to a fifteenth aspect of the invention, there is provided the protection method for an electric vehicle inverter apparatus as in the thirteenth aspect, wherein the gate power supply circuit portion includes a resistor and a zener diode series-connected via a diode between the DC bus, and electrolytic capacitors series-connected to each other and parallel-connected to the resistor and the zener diode, respectively; and a zener voltage of the zener diode is higher than an operable voltage of the drive circuit portion, and equal to and lower than an allowable gate voltage of the power semiconductor element.

According to a sixteenth aspect of the invention, there is provided the protection method for an electric vehicle inverter apparatus as in the fourteenth aspect, wherein the forced discharge circuit portion is configured so that a discharge command latch portion is provided between the discharge command delay portion and the discharge signal insulation portion and maintains a discharge command signal; and the forced discharge circuit portion outputs a discharge state monitoring signal to a vehicle control controller.

According to a seventeenth aspect of the invention, there is provided the protection method for an electric vehicle inverter apparatus as in the fifteenth aspect, wherein the gate power supply circuit portion is configured so that a discharge restart transistor and a discharge restart resistor series-connected to each other are parallel-connected to the zener diode and the electrolytic capacitor parallel-connected to each other; and when receiving a discharge restart signal from a restart command portion of the vehicle control controller just upon completion of a discharge operation, the gate power supply circuit portion turns on the discharge restart transistor and discharges charges charged into the electrolyte capacity.

<Advantages of First and Twelfth Aspects of the Invention>

According to first and twelfth aspects of the invention, when a collision accident of electric vehicles or the like occurs, the inverter main circuit connection switch of the high-voltage battery unit is instantly released according to a collision detection signal output from the collision detector. Simultaneously, the collision detection signal is input to the forced discharge circuit portion of the inverter apparatus as a discharge command signal. Then, a high voltage developed across the main circuit capacitor into which electric charges are charged is discharged by the discharge resistor. Thus, the invention has advantages that overheat of the high-voltage battery, which may be caused by a short-circuit current due to the contact of a broken power line or a vehicle body with the high-voltage portion, can be prevented from occurring, and that a safety-improved electric vehicle inverter apparatus can be provided.

<Advantages of Second and Thirteenth Aspects of the Invention>

According to second and thirteenth aspects of the invention, a discharge command signal generated at the occurrence of a collision of vehicles is latched by the discharge signal latch circuit portion. Thus, even when the power supply from a low-voltage battery to the inverter apparatus is interrupted so that the discharge command signal is inoperable, the operating power of the forced discharge circuit portion is generated from the high voltage supplied from the main circuit capacitor. Consequently, the apparatus can continues to perform the discharge operation until the terminal voltage of the main circuit capacitor is lowered to a low voltage.

<Advantages of Third and Fourteenth Aspects of the Invention>

According to third and fourteenth aspects of the invention, occurrence of chattering of the discharge command signal can be prevented. Even when the low-voltage battery is interrupted, voltage reduction can be prevented for a while. Thus, the discharge operation of the forced discharge circuit portion can be started up.

<Advantages of Fourth and Fifteenth Aspects of the Invention>

According to fourth and fifteenth aspects of the invention, the start-up improvement electrolytic capacitor is provided in the gate power supply circuit portion of the forced discharge circuit portion. Thus, a gate power supply voltage can instantly be stored therein. Consequently, even when a discharge command signal is input simultaneously with the start-up of the apparatus, the discharge operation can be performed.

<Advantages of Fifth Aspect of the Invention>

According to a fifth aspect of the invention, a plurality of types of power semiconductor element, such as a MOSFET or an insulated gate bipolar transistor (IGBT), can be utilized. Particularly, when a gate driving type power semiconductor element is used, a gate current is consumed only when the gate driving type power semiconductor element is turned on. Thus, the gate drive power supply can be miniaturized. The flexibility of design can be enhanced.

<Advantages of Sixth Aspect of the Invention>

According to a sixth aspect of the invention, the discharge command signal is latched by the discharge signal latch circuit portion. Thus, even when the power supply from a low-voltage battery to the inverter apparatus is interrupted so that the discharge command signal is "down", the apparatus can continue to apply the gate voltage to the power semiconductor element of the discharge circuit portion. Consequently, the apparatus can maintain the discharge operation until the output voltage of the gate power supply circuit portion is lowered to a value that is equal to or lower than a predetermined voltage.

<Advantages of Seventh Aspect of the Invention>

According to a seventh aspect of the invention, even in a case where the discharge resistor reaches an overheat condition while the inverter apparatus maintains a state in which a high voltage is applied to the main circuit capacitor thereof, the apparatus performs an operation of turning off the gate voltage of the power MOSFET of the discharge circuit portion according to a discharge current detection signal. Thus, the apparatus stops the discharge operation. In addition, even when there is no discharge current detection signal, the discharge resistor can be prevented by maintaining a discharge operation stopped state while the high voltage continues to be applied to the main circuit capacitor.

<Advantages of Eighth, Ninth and Sixteenth Aspects of the Invention>

According to eighth, ninth and sixteenth aspects of the invention, no discharge signal latch circuit portion is provided in the forced discharge circuit portion at a high voltage terminal side, whereas a discharge signal latch circuit portion is provided at a low voltage terminal side. In addition, the discharge command latch signal is output to the vehicle control controller as a discharge state signal. Then, a discharge operation is monitored. Consequently, the discharge resistor can be prevented by controlling a high voltage so as not to be applied to the inverter apparatus during the discharge operation.

The power supply from the low-voltage battery is interrupted by an operation of the collision detector. Subsequently, a control power supply voltage is maintained by the storage portion for a while. However, when the control power supply voltage is lowered to a value close to 0V, the discharge command latch signal is automatically cancelled. Thus, the discharge operation can be stopped.

<Advantages of Tenth and Seventeenth Aspects of the Invention>

According to tenth and seventeenth aspects of the invention, a discharge restart signal is output from the restart command portion of the vehicle control controller to the discharge restart transistor of the forced discharge circuit portion. Thus, an output voltage of the gate power supply circuit portion is lowered to 0V. Consequently, even when a high voltage is applied again to the forced discharge circuit portion upon completion of a discharge operation, a restart operation can be performed in a short time.

<Advantages of Eleventh Aspect of the Invention>

According to an eleventh aspect of the invention, a relay can be used as an alternative of a power semiconductor element of the discharge circuit portion. When the gate portion is damaged by noises or the like, a failure may occur in the power semiconductor element so as to put the circuit into a constant conduction state. On the other hand, the relay has a structure in which an excitation winding and a contact point portion are insulated from each other, so that the relay is resistant to the influence of noises. Accordingly, there is no fear that the circuit may be brought into a failure mode into which the circuit using the power semiconductor element would be brought.

BRIEF DESCRIPTION OF THE DRAWINGS

Embodiments of the present invention will be described in detail based on the following figures, wherein.

DETAILED DESCRIPTION OF THE PREFERRED EMBODIMENTS

Figure 1:
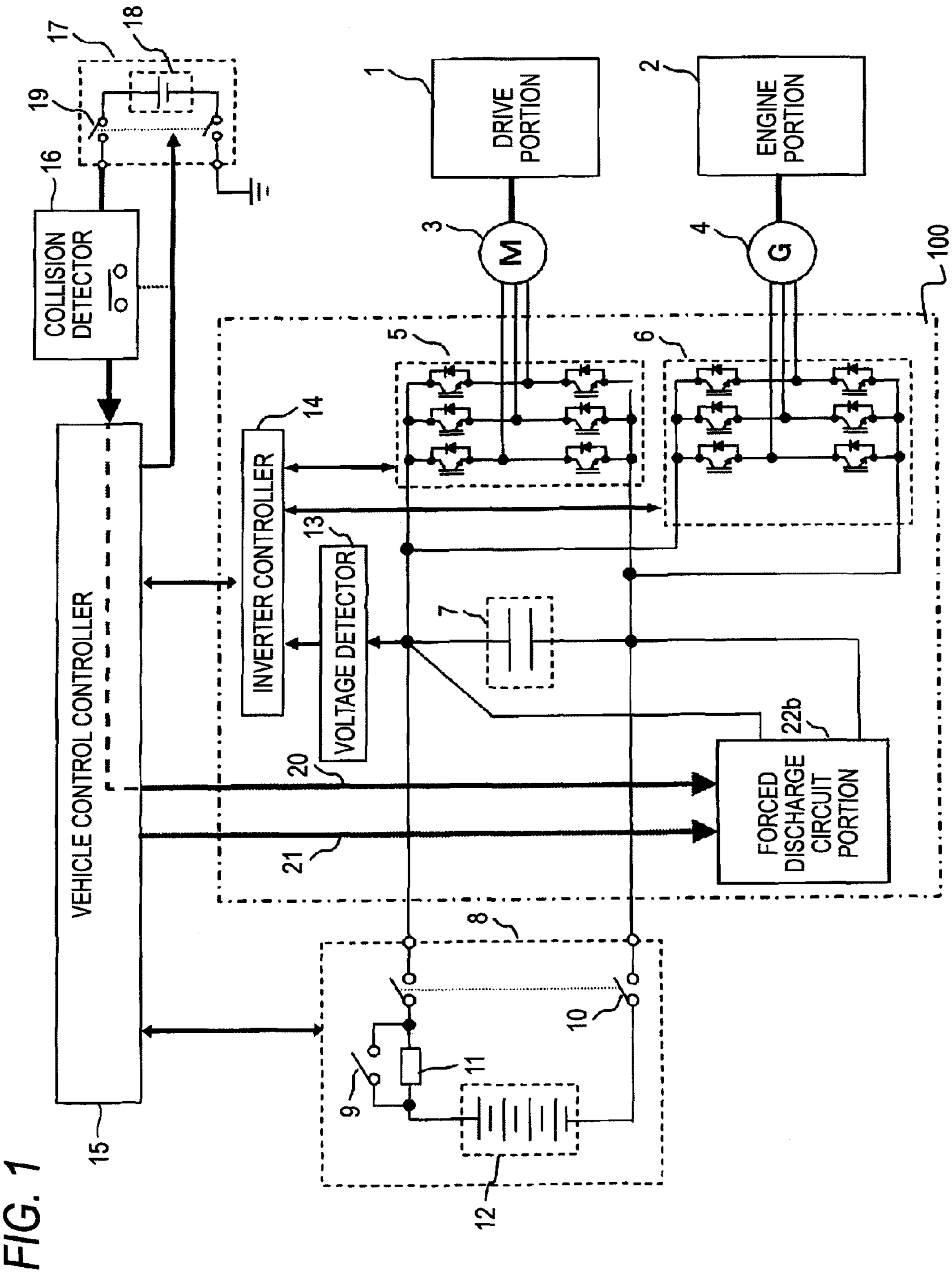
FIG. 1 is a diagram illustrating the entire configuration of an electric vehicle inverter apparatus according to Embodiment 1 of the invention and peripheral devices thereof.

Hereinafter, embodiments of the invention are described with reference to FIGS. 1 to 10.

Although an actual inverter apparatus mounted in an electric vehicle incorporates various functions and means, the embodiments are described by illustrating only functions and means relating to the invention in the drawings. Redundant description of the functions and the means is omitted by designating the same function or means with the same reference numeral.

[Embodiment 1]

FIG. 1 illustrates the entire configuration of an electric vehicle inverter apparatus according to Embodiment 1 of the invention and peripheral devices thereof.

<Circuit Configuration of Embodiment 1>

Referring to FIG. 1, reference numeral 1 designates a vehicle drive portion such as tires and wheels. Numeral 2 denotes an electric vehicle power-generating engine portion. Numeral 3 designates a three-phase AC electric motor mechanically connected to the vehicle drive portion 1. Numeral 4 denotes a three-phase AC electric generator for generating electric power by the drive force of an engine. Numeral 100 designates an inverter apparatus. Numeral 8 denotes a car-mounted high-voltage battery unit. Numeral 15 designates a vehicle control controller for supervisingly controlling the entire vehicle. Numeral 16 denotes a collision detector which operates, when detecting impact caused by a collision between electric vehicles, so that an internal switch is opened. Numeral 17 designates a low-voltage battery unit.

<<Configuration of Inverter Apparatus 100>>

The inverter apparatus 100 includes an inverter portion 5 for driving a three-phase AC electric motor 3, a converter portion 6 for converting electric power generated by the three-phase AC electric generator into a DC voltage within a predetermined voltage range, a main circuit capacitor 7 connected between common DC bus of the inverter portion 5 and the converter portion 6, a voltage detector 13 for detecting a main circuit DC voltage, an inverter controller 14 for controlling the inverter portion 5 and the converter portion 6, and a forced discharge circuit portion 22*b* for discharging electric charges stored in the main circuit capacitor 7 charged to a high voltage according to a command represented by a discharge signal 20 or 21.

The inverter portion 5 is a known three-phase inverter circuit which includes six IGBTs and flywheels inversely parallel connected to the IGBTs, respectively.

The converter portion 6 is constituted by a circuit that includes six IGBTs and flywheels inversely parallel connected to the IGBTs, respectively.

<<Configuration of Car-Mounted High-Voltage Battery Unit 8>>

Reference numeral 8 designates a car-mounted high-voltage battery unit which includes a high-voltage battery inrush circuit 9, an inverter main circuit connection switch 10, an inrush current suppression resistor 11, and a car-mounted high-voltage battery 12, such as a lithium battery.

<<Function of Vehicle Control Controller 15>>

The vehicle control controller 15 controls the inverter controller 14 of the inverter apparatus, the forced discharge circuit portion 22*b*, the high-voltage battery unit 8, other peripheral devices, and the like. A signal 20 output from the vehicle control controller 15 represents a discharge signal (FD1) which is synchronized with a detection signal output from the collision detector 16. A signal 21 represents a discharge signal (FD2) output from the vehicle control controller 15.

<<Configuration of Low-Voltage Battery Unit 17>>

The low-voltage battery unit 17 includes a low-voltage battery 18 and a switch 19 whose on/off control is performed by the vehicle control controller 15.

Next, an operation of Embodiment 1 is described hereinafter with reference to FIG. 1.

<Problem 1 at Collision: Fear of Generation of Short-Circuit Current of High-Voltage Battery 12>

In a case where electric vehicles collide with each other due to some accident or the like, when a high-voltage portion connection cable of the inverter apparatus 100 is broken due to the impact of the collision and touches, e.g., a vehicle body, short-circuit current flows through the high-voltage battery 12. Thus, there is a fear that the high-voltage battery 12 may overheat.

<Problem 2 at Collision: Fear of Generation of Short-Circuit Current of Main Circuit Capacitor 7>

There are fears that both terminals of the main circuit capacitor 7 of the inverter apparatus 100 may be short-circuited by the contact between the broken cable and the vehicle body, and that a short-circuit current due to a high voltage may flow therethrough.

<Operation 1 for Solving Problem 1>

When the collision detector 16 detects impact caused by a collision of electric vehicles, an internal switch of the collision detector 16 is opened. The collision detector 16 is connected between the low-voltage battery unit 17 and the vehicle control controller 15. Thus, when the switch of the collision detector 16 is opened, a voltage from the low-voltage battery 18 is not supplied to the vehicle control controller 15. In response to the voltage turn-off signal, the inverter main circuit connection switch 10 of the high-voltage battery unit 8 is simultaneously opened, so that the connection between the high-voltage battery unit 8 and the main circuit portion of the inverter apparatus 100 is forcibly disconnected. The risk of overheating the high-voltage battery 12 due to short-circuit current can be avoided by performing this operation.

<Operation 1 for Solving Problem 2>

Using the discharge signal (FD1) 20 which operates in the open state, or the discharge signal (FD2) 21 output from the vehicle control controller 15, the forced discharge circuit portion 22*b* is caused to perform a discharge operation. Thus, the high voltage developed across the main circuit capacitor 7 of the inverter apparatus 100 is forcibly discharged. Consequently, the generation of a short-circuit current or the like due to the contact between the broken cable to the vehicle body can be prevented.

<Operation 2 for Solving Problem 2>

When the state of a vehicle drive key of an electric vehicle is changed from an on-state to an off-state, the switch 19 of the low-voltage battery unit 17 is opened. Thus, the low-voltage battery 18 is disconnected from the aforementioned collision detector 16. Consequently, the apparatus can obtain advantages similar to those in the aforementioned case where the collision detector 16 operates. Accordingly, the high voltage developed across the main circuit capacitor 7 of the inverter apparatus 100 can be discharged by the forced discharge circuit portion 22*b*.

[Embodiment 2]

<Circuit Configuration of Embodiment 2>

Figure 2:
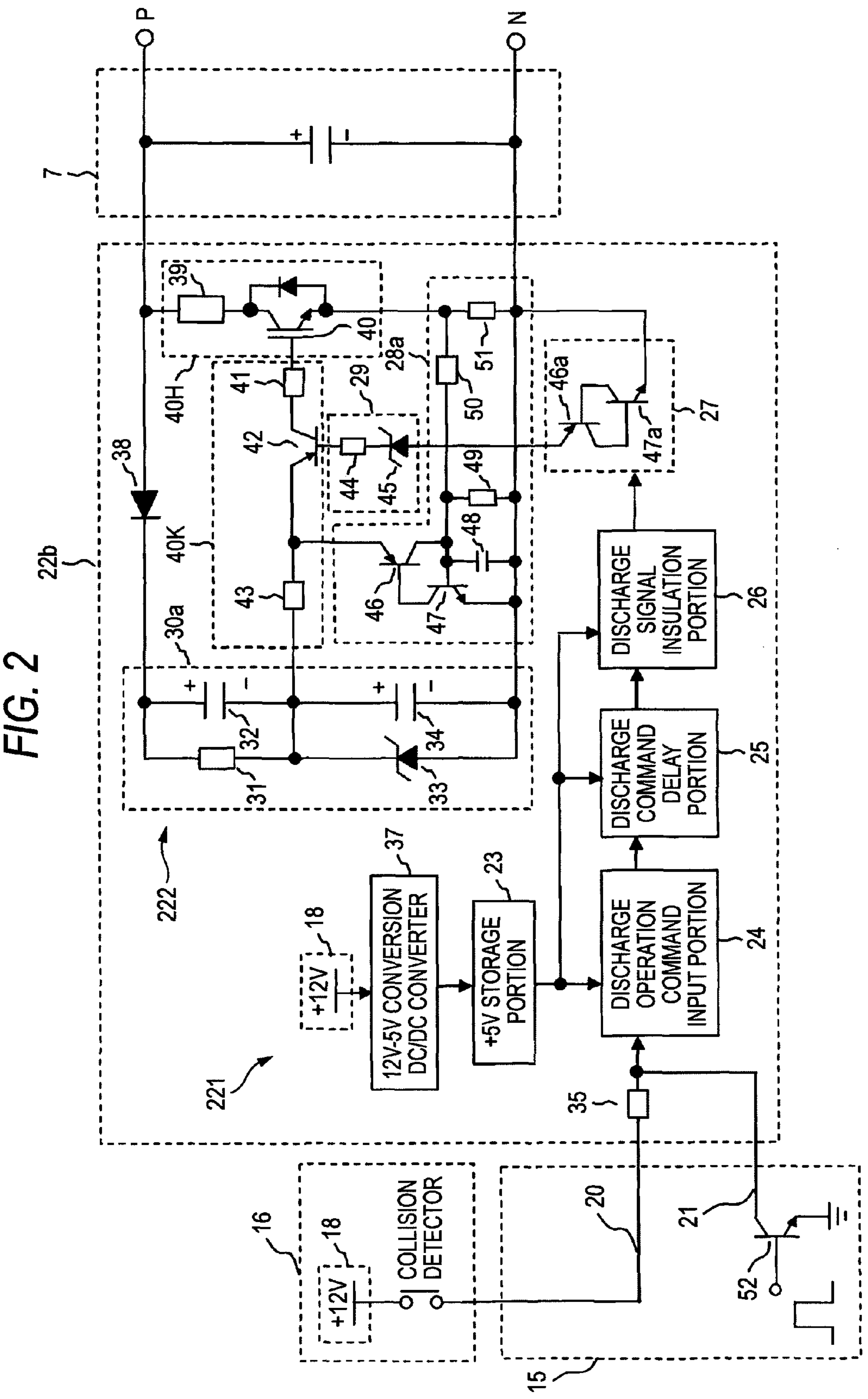
FIG. 2 is a diagram illustrating the details of a forced discharge circuit portion 22*b* according to Embodiment 2 of the invention.

FIG. 2 is a diagram illustrating the details of the forced discharge circuit portion 22*b* illustrated in FIG. 1 according to Embodiment 2 of the invention. As illustrated in FIG. 2, a circuit according to Embodiment 2 includes the collision detector 16, the vehicle control controller 15, the forced discharge circuit portion 22*b*, and the main circuit capacitor 7 of the inverter apparatus 100. The collision detector 16 connected in the "open" state to the low-voltage battery unit 17 (see FIG. 1) outputs a discharge signal (FD1) 20 to the forced discharge circuit portion 22*b* as a collision detection signal via the vehicle control controller 15.

In addition, the vehicle control controller 15 connects the collector of a grounded-emitter transistor 52 to the discharge signal (FD1) 20. The vehicle control controller 15 outputs the discharge signal (FD2) 21 to the forced discharge circuit portion 22*b* in response to a turn-on operation of the grounded-emitter transistor 52. The forced discharge circuit portion 22*b* is connected to the terminals P and N of the main circuit capacitor 7 and includes a functional block portion 221 and a forced discharge circuit 222 controlled by the functional block portion 221.

First, the functional block portion 221 is described hereinafter with reference to FIG. 2.

<Circuit Configuration of Functional Block Portion 221>

The functional block portion 221 includes the low-voltage battery 18, a 12V-5V voltage conversion DC-DC converter 37, a +5V storage portion 23, a discharge operation command input portion 24 for receiving and inputting the aforementioned discharge signal (FD1) 20 and the discharge signal (FD2) 21, a discharge command delay portion 25, and a discharge signal insulation portion 26.

Next, a forced discharge circuit 222 is described hereinafter.

<Circuit Configuration of Forced Discharge Circuit 222>

The forced discharge circuit 222 includes the discharge signal latch circuit portion 27, the discharge resistor overheat protection circuit portion 28*a*, a PNP transistor drive circuit portion 29, a gate power supply circuit portion 30*a*, a discharge circuit portion 40H, and a drive circuit portion 40K for driving the power MOSFET 40.

1) The discharge signal latch circuit portion 27 includes a PNP transistor 46*a* and an NPN transistor 47*a*, which are connected together as a thyristor.
2) The discharge resistor overheat protection circuit portion 28*a* includes a discharge current detection resistor 51 for detecting a discharge current, a delay resistor 50 for delaying a detected voltage, a detection voltage delay capacitor 48 therefor, a resistor 49 parallel-connected to the capacitor 48, and a PNP transistor 46 and an NPN transistor 47 which constitute a latch circuit.
3) The discharge circuit portion 40H includes the discharge resistor 39 and the power MOSFET 40.
4) The drive circuit 40K for driving the power MOSFET 40 includes a gate drive resistor 41 for driving the gate of the power MOSFET 40, a power MOSFET gate drive PNP transistor 42, and a resistor 43 which serves also as a power MOSFET gate drive resistor and is used to reduce an inrush current when the discharge resistor overheat protection circuit portion 28*a* is driven.
5) The PNP transistor drive circuit portion 29 includes a resistor 44 for the base of the PNP transistor 42, and a zener diode 45 serving as a reference power supply for the base of the PNP transistor 42.
6) The gate power supply circuit portion 30*a* includes the resistor 31 for limiting electric current when electric power is supplied, the zener diode 33 for generating a gate power supply voltage, the electrolytic capacitor 34 serving as a storage portion for storing the gate power supply voltage, and the start-up improvement electrolytic capacitor 32 capable of rapidly performing the supply of a start-up power at the start-up. The gate power supply circuit portion 30*a* generates electric power from the high voltage developed across the main circuit capacitor 7 and supplies electric power to the gate circuit portion for the power MOSFET 40, and to the discharge resistor overheat protection circuit portion 28*a*. A voltage applicable to the zener voltage of the zener diode 33 is equal to or higher than the zener voltage of the zener diode 45 and equal to or lower than the allowable gate voltage of the power MOSFET 40.

Next, discharge operations of the functional block portion 221 and the forced discharge circuit 222 of the forced discharge circuit portion 22*b* are described hereinafter with reference to FIG. 2.

<Operation of Discharge Circuit is Possible for a while Even when Battery Unit is Turned Off at Collision>

When the collision detector 16 detects impact, the switch 19 of the low-voltage battery unit 17 is opened. Simultaneously with this, the low-voltage battery 18 of the forced discharge circuit portion 22*b* is opened. Thus, electric power is not supplied from the low-voltage battery 18. A control power supply for a circuit operation is necessary for the discharge operation command input portion 24, the discharge command delay portion 25, and the discharge signal insulation portion 26 of the forced discharge circuit portion 22*b*. When electric power for control is not supplied thereto, a discharge operation cannot be performed. Thus, an operation of the discharge circuit can be performed by providing, in the forced discharge circuit portion 22*b*, the +5V storage portion 23 which can maintain, for a while, the electric power for control even when electric power for control (electric power supplied from the low-voltage battery 18) from the low-voltage battery unit 17 is interrupted.

There is a fear that a chattering signal and a noise may be superimposed on the discharge signal (FD1) 20 serving as an open signal to be used when the collision detector 16 operates. However, in order to prevent occurrence of such a malfunction, filtering is performed at the discharge command delay portion 25 after the discharge operation command input portion 24 receives a signal. Thus, a malfunction is prevented. Because a high voltage circuit portion and a low-voltage circuit portion are insulated by the discharge signal insulation portion 26. Consequently, an operation of the discharge signal latch circuit portion 27 of the high voltage circuit portion can be performed.

<Discharge Operation of Discharge Circuit>

Next, a discharge operation is briefly described hereinafter.

When the collision detector 16 is operated by the collision of electric vehicles, a discharge signal (FD1) 20 is sent therefrom, so that the discharge signal latch circuit portion 27 is turned on. Consequently, the gate drive PNP transistor 42 is turned on. Thus, the gate of the power MOSFET 40 is driven, so that the power MOSFET 40 is turned on.

Figures 3A, 3B, 3C:
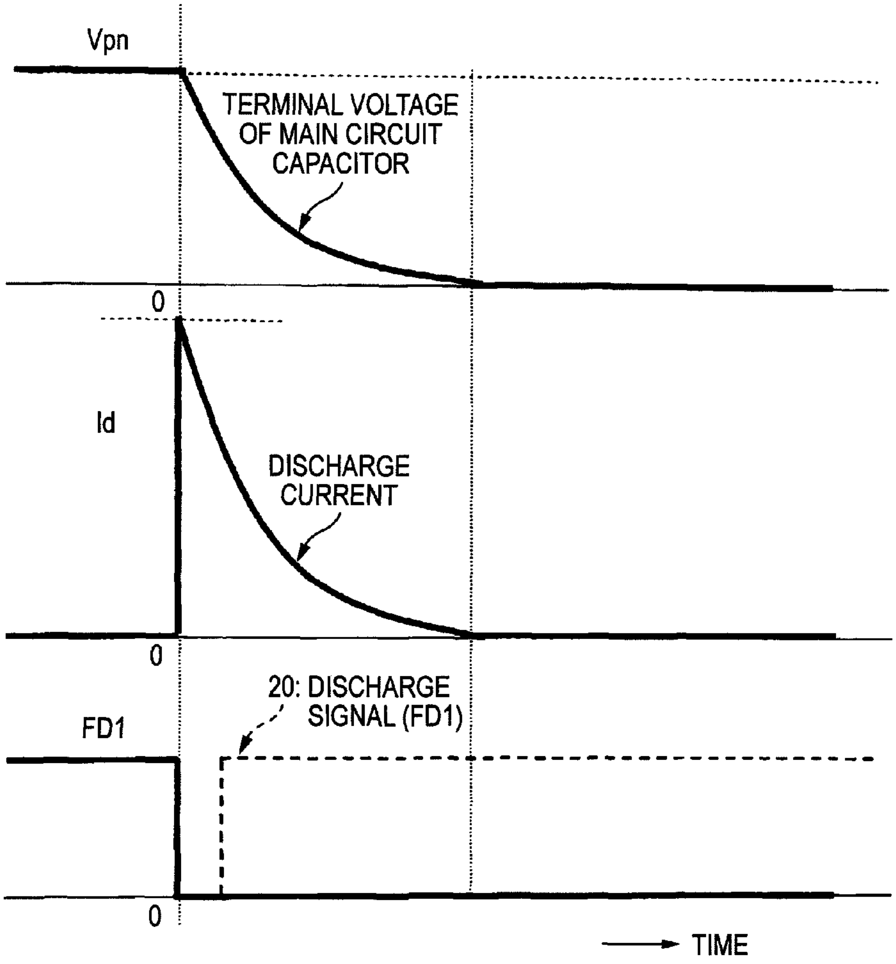
FIGS. 3A to 3C are waveform charts illustrating a discharge operation of the forced discharge circuit portion 22*b* according to Embodiment 2 of the invention.
Figure 4:
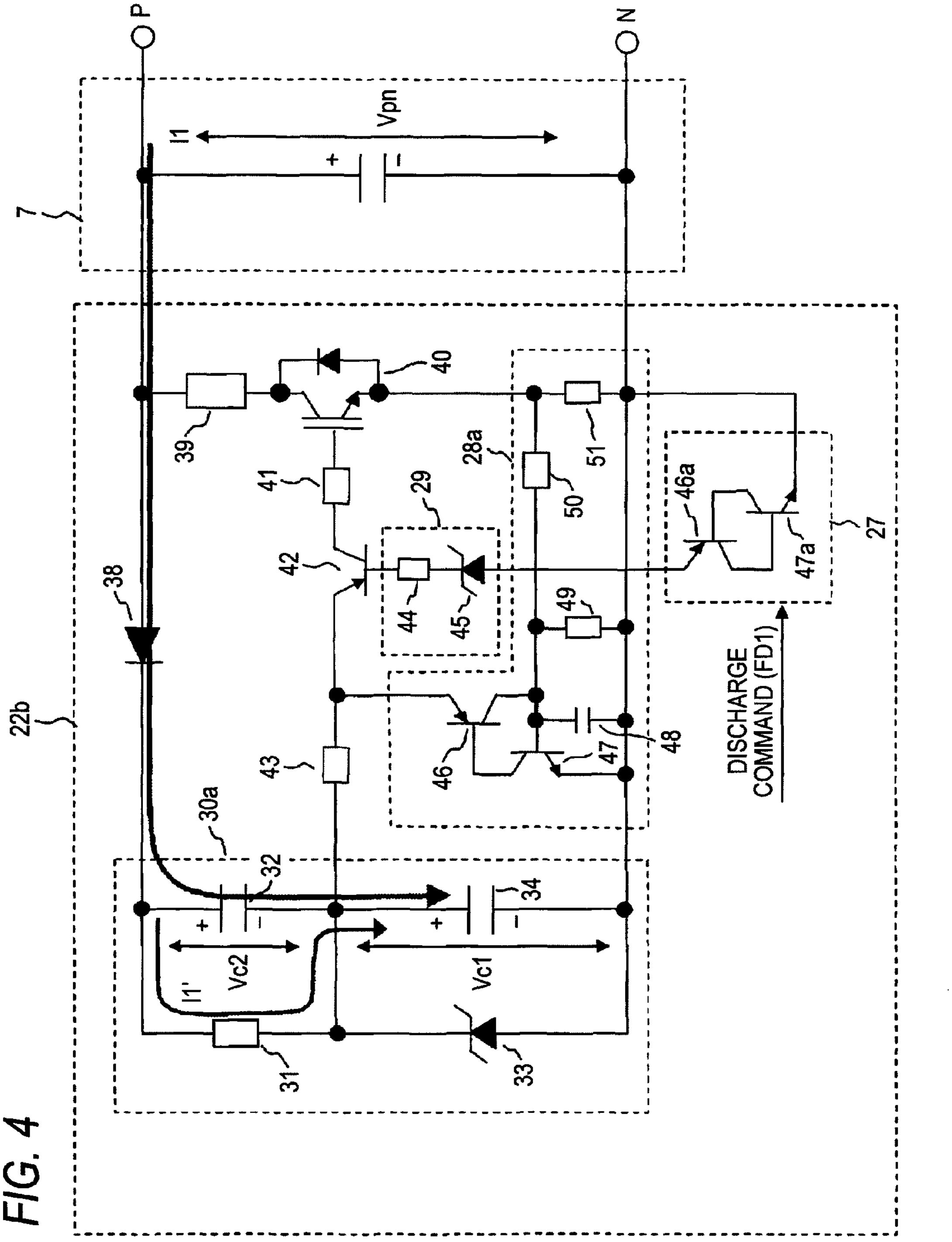
FIG. 4 is a diagram illustrating a start-up electric-current path to a gate power supply circuit portion 30*a* of the forced discharge circuit portion 22*b* according to Embodiment 2 of the invention.

The terminal voltage Vpn of the main circuit capacitor 7 is short-circuited by the power MOSFET 40 via the discharge resistor 39. Thus, a discharge operation is performed such that a discharge curve representing the discharge current Id is set, as illustrated in FIG. 3B. The terminal voltage Vpn is lowered to 0V, as illustrated in FIG. 3A. The discharge circuit portion 40H can be constituted by an IGBT and a bipolar transistor, instead of using the aforementioned power MOSFET 40.

The gate power supply circuit portion 30*a* is connected to the high voltage portion of the main circuit. Thus, the gate power supply circuit portion 30*a* can supply a gate power supply voltage until the discharge is completed. Consequently, when a collision between vehicles occurs, a discharge signal (FD1) 20 is sent from the collision detector 16. After the discharge signal latch circuit portion 27 is turned on, the discharge signal is maintained until the output voltage of the gate power supply circuit portion 30*a* is lower to the zener voltage of the zener diode 45 or so.

Accordingly, the discharge circuit is configured so that a discharge operation can be performed by the gate power supply circuit portion 30*a* and the discharge signal latch circuit portion 27, each of which is supplied with electric power from an independent power supply, even in a case where a discharge signal is not input for a long time after the low-voltage battery 18 is interrupted.

Even in a case where a discharge signal (FD1) 20 is canceled halfway through a discharge operation, as illustrated in FIG. 3C, the discharge operation can be continued while the terminal voltage Vpn of the main circuit capacitor 7 is maintained by the discharge signal latch circuit portion 27.

The discharge signal of the discharge signal latch circuit portion 27 is canceled when an output voltage of the gate power supply circuit portion 30*a* for the gate of the power MOSFET 40 is reduced by the discharge operation so as to be lower than the zener voltage of the zener diode 45, which determines the base reference voltage of the gate drive PNP transistor 42, in a case where the terminal voltage Vpn of the main circuit capacitor 7 is equal to 0V.

<Operation of Improving Rising Characteristic of Output Voltage of Gate Power Supply Circuit Portion>

Next, an operation for improving the rise characteristics of the output voltage of the gate power supply circuit portion 30*a* at power-up.

When the electric vehicle inverter apparatus 100 starts up, electric current I1 flows from the high-voltage battery unit 8 through the start-up improvement electrolytic capacitor 32 and the gate power supply electrolytic capacitor 34 of the gate power supply circuit portion 30*a*. The inter-terminal voltage Vc1 of the gate power supply electrolytic capacitor 34 is raised up to the zener voltage of the zener diode 33 by charging the capacitor 34. In a case where the voltage Vc1 of the gate power supply electrolytic capacitor 34 is lowered after the capacitor 34 is charged, electric current I1 flows from the high-voltage battery unit 8, so that the output voltage of the gate power supply circuit portion 30*a* is maintained.

In a case where the start-up improvement electrolytic capacitor 32 is not provided therein, the electric current I1 flows through the path of the current I1' at the start-up. Thus, the rise time of the voltage Vc1 of the gate power supply electrolytic capacitor 34 is increased, as illustrated in FIG. 5. In a case where a time Ts2 taken by the voltage Vc1 of the gate power supply electrolytic capacitor 34 to reach a power supply voltage value (hereinafter referred to as a "dischargeable voltage"), at which a discharge operation can be performed, is too long, for example, when a collision between electric vehicles occurs just after the electric vehicles start, and when the output voltage of the gate power supply circuit portion 30*a* does not reach the dischargeable voltage, the discharge operation is not performed though the discharge signal (FD1) 20 is sent.

Figures 5A, 5B, 5C, 5D:
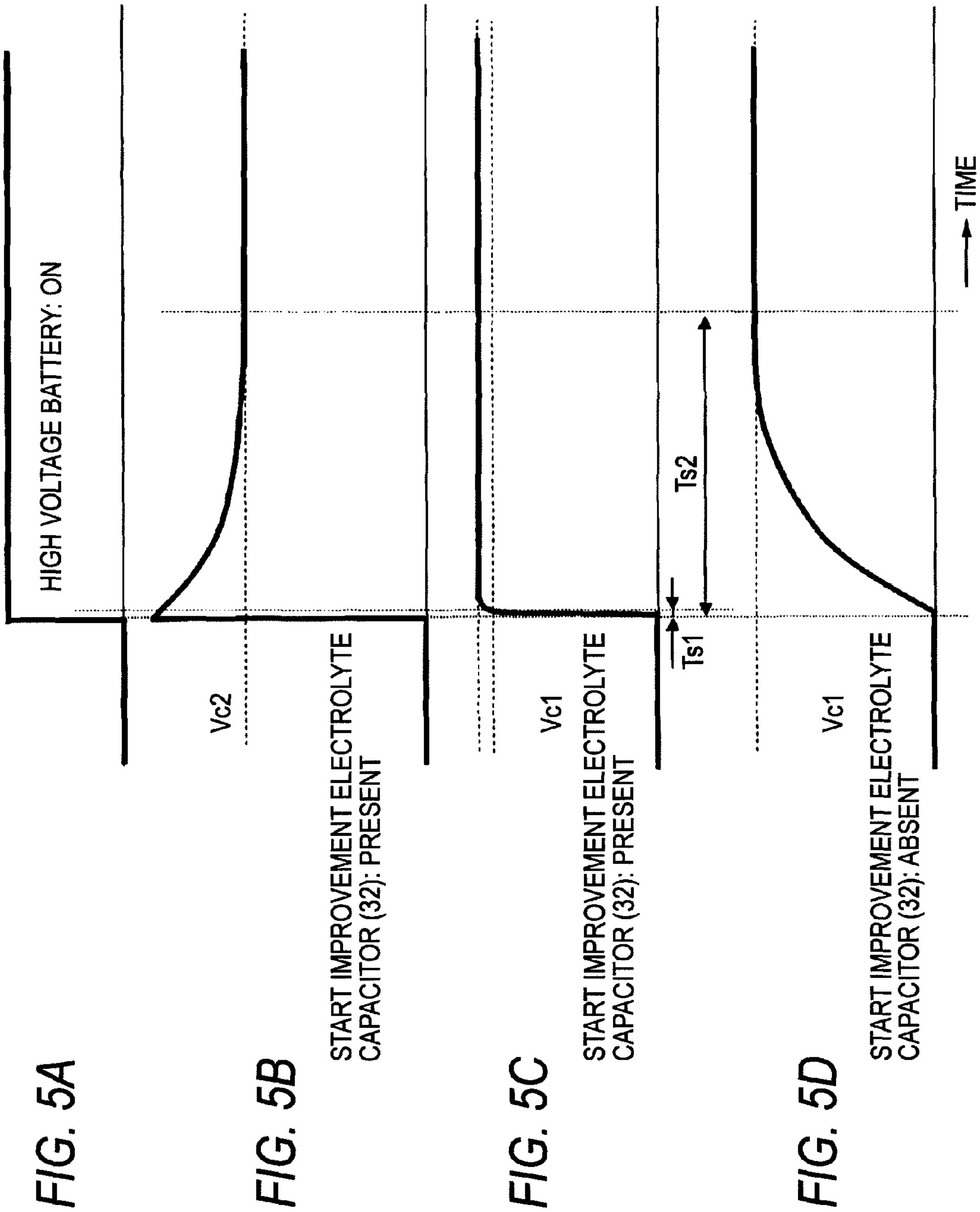
FIGS. 5A to 5D are waveform charts illustrating the rising characteristics of an output voltage of the power supply circuit portion 30*a* in cases where a start-up improvement electrolytic capacitor 32 illustrated in FIG. 4 is present and where the start-up improvement electrolytic capacitor 32 is absent.

When the power supply starts at the start-up, the capacity of the start-up improvement electrolytic capacitor 32 is selected such that the voltage Vc1 of the gate power supply electrolytic capacitor 34 reaches the dischargeable voltage in a safe start-up time Ts1. Thus, as illustrated in FIGS. 5B and 5C, the voltage Vc2 of the start-up improvement electrolytic capacitor 32 enables the output voltage of the gate power supply circuit portion 30*a* to instantly rise.

<Operation of Protecting Discharge Resistor from Being Overheated>

Next, an operation of protecting the discharge resistor from being overheated is described hereinafter with reference to FIG. 6.

When the high-voltage battery unit 8 is in an open state, and a discharge command FD1 is input to the discharge signal latch circuit portion 27, the gate drive PNP transistor 42 for driving the gate of the power MOSFET 40 is tuned on. Then, a voltage is applied to the gate of the power MOSFET 40, so that the power MOSFET 40 is turned on. At that time, a discharge current Id flows through the discharge resistor 39 due to the high voltage of the main circuit capacitor 7. The discharge current Id has a waveform illustrated in FIG. 3B, which is represented by an attenuation curve, and is reduced to 0 by flowing through the path designated with a circled number 1.

However, when the high-voltage battery unit 8 goes wrong and remains connected to the main circuit of the inverter apparatus, the current Id continues to flow in the discharge resistor 39. Thus, the discharge resistor 39 overheats and is put into a high temperature state. Finally, the discharge resistor 39 is damaged. In some operating condition of the inverter apparatus, a high-temperature continuously applied state lasts long. In such a case, when a discharge command FD1 is input, the discharge resistor 39 may be damaged at high temperature. Thus, it is necessary to protect the discharge resistor 39 by turning off the power MOSFET 40 within an energizing time in which the discharge resistor 39 does not overheat and is not damaged.

Figure 6:
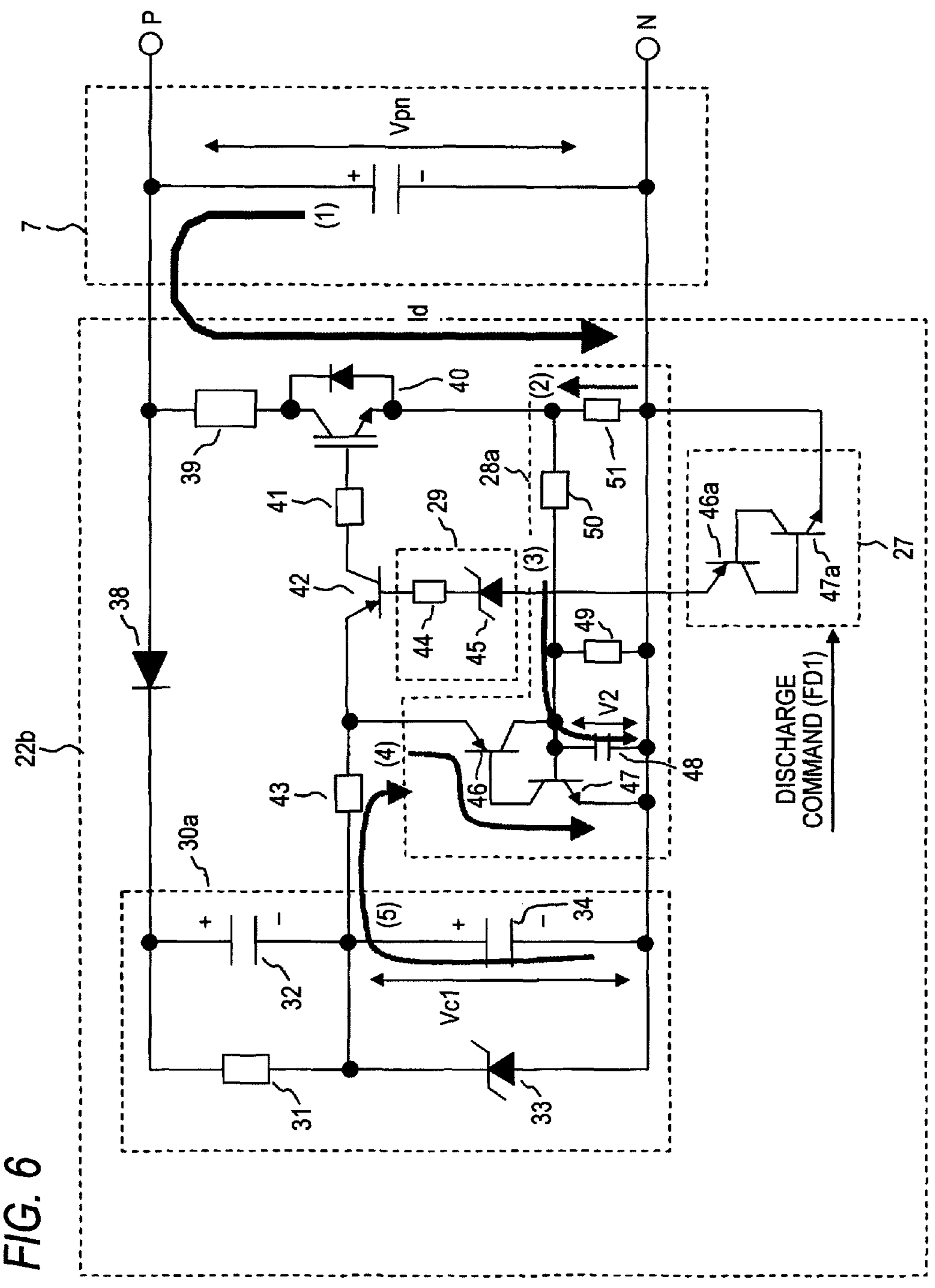
FIG. 6 is a diagram illustrating an operation of protecting a discharge resistor 39 of the forced discharge circuit portion 22*b* according to Embodiment 2 of the invention from being overheated.
Figures 7A, 7B, 7C, 7D, 7E:
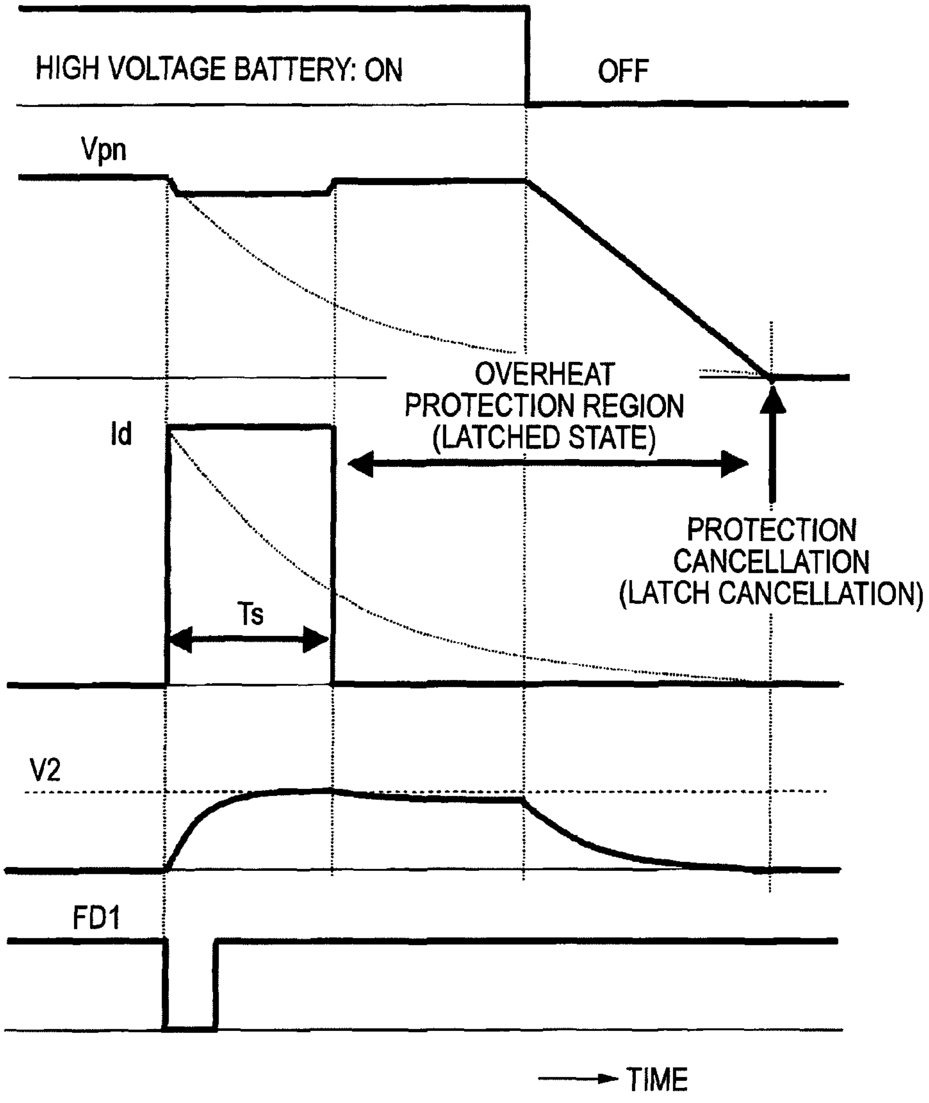
FIGS. 7A to 7E are waveform charts illustrating an operation of a discharge resistor overheat protection circuit portion 28*a* in FIG. 6, which show waveforms of signals at components of the circuit portion 28*a*, respectively.

Referring to FIG. 6, the time constant of a delay circuit including a resistor 50 and a capacitor 48 is set at a discharge allowable time Ts as illustrated in FIG. 7C which will be described below. When an output voltage obtained via the resistor 50 and the capacitor 48 from the terminal voltage of a discharge current detection resistor 51 through a path designated with a circled number 2 exceeds V2, an NPN transistor 47 is turned on through a path designated with a circled number 3. When the NPN transistor 47 is turned on, a base current flows from the emitter of a PNP transistor 46 through a path designated with a circled number 4. Then, the emitter-collector junction of the PNP transistor 46 is turned on, so that electric current flows in the base of the NPN transistor 47. At that time, a resistor 43 is installed between the gate power supply electrolytic capacitor 34 and the PNP transistor 46. Thus, the present embodiment has a function of suppressing an inrush current through a path designated with a circled number 5 when this transistor is turned on, thereby preventing the transistor from being damaged.

When a high voltage continues to be applied to the main circuit capacitor 7, electric current continues to flow through a path designated with a circled number 4 illustrated in FIG. 6 via the diode 38 and the resistor 31. The input voltage of the gate drive PNP transistor 42 maintains an interrupted state. Consequently, the gate voltage of the power MOSFET 40 becomes 0V. As long as the high voltage continues to be applied thereto, the power MOSFET maintains an off-state so as to prevent the discharge resistor 39 from being overheated and damaged.

When the high-voltage battery unit 8 is in the open state, and the voltage Vpn of the main circuit capacitor 7 is 0V, and the output voltage of the gate power supply circuit portion 30*a* is lowered to 0V, the energizing state of the PNP transistor 46 and the NPN transistor 47 is cancelled and changed into an off-state. Consequently, the discharge stopped state (protection latch state) is cancelled. The apparatus is returned to a state in which all the circuits are not destructed and can be restarted.

FIGS. 7A to 7E are waveform charts illustrating an operation of the discharge resistor overheat protection circuit portion 28*a* in FIG. 6, which show waveforms of signals at components of the circuit portion 28*a*, respectively. Hereinafter, an operation of protecting the discharge resistor 39 is described by referring to FIGS. 7A to 7E.

As illustrated in FIG. 7A, when the inverter main circuit connection switch 10 of the high-voltage battery unit 8 is in an on-state, the terminal voltage Vpn of the main circuit capacitor 7 is in a high-voltage state. When the discharge signal (FD1) 20 (see FIG. 6) is input to the formed discharge circuit portion 22*b* in this state, the power MOSFET 40 is turned on, so that the discharge current Id flows through the discharge resistor 39. However, the high-voltage battery 12 (see FIG. 1) remains connected to the inverter main circuit. Thus, the terminal voltage Vpn maintains a constant voltage, as indicated by the waveform of the voltage Vpn illustrated in FIG. 7B. Thus, the discharge current Id is put into a state in which the discharge current Id remains flowing as a constant current. Accordingly, there is a fear that the discharge resistor 39 may overheat and may be burn out.

Thus, the discharge resistor overheat protection circuit portion 28*a* illustrated in FIG. 6 interrupts the input voltage of the gate drive PNP transistor 42 in the discharge allowable time Ts set by the time constant of the delay circuit including the resistor 50 and the capacitor 48. In addition, the discharge resistor overheat protection circuit portion 28*a* maintains the interrupted state and turns off the power MOSFET 40 (see FIG. 7C). When the high-voltage battery 12 remains connected to the inverter main circuit, the protection latch state of the discharge resistor overheat protection circuit portion 28*a* is canceled. Thus, the power MOSFET 40 maintains an off-state, so that the discharge resistor 39 is not energized and does not overheat.

Next, when the inverter main circuit connection switch 10 of the high-voltage battery unit 8 is tuned off, the voltage Vpn is gradually lowered as shown in FIG. 7B because the high-voltage battery 12 is not connected to the inverter main circuit. When Vpn=0V, the output voltage of the gate power supply circuit portion 30*a* is 0V. Consequently, the protection latch state of the latch circuit including the PNP transistor 46 and the NPN transistor 47 is canceled.

[Embodiment 3]

<Difference Between Forced Discharge Circuit Portion According to Embodiment 3 and that According to Embodiment 2>

Figure 8:
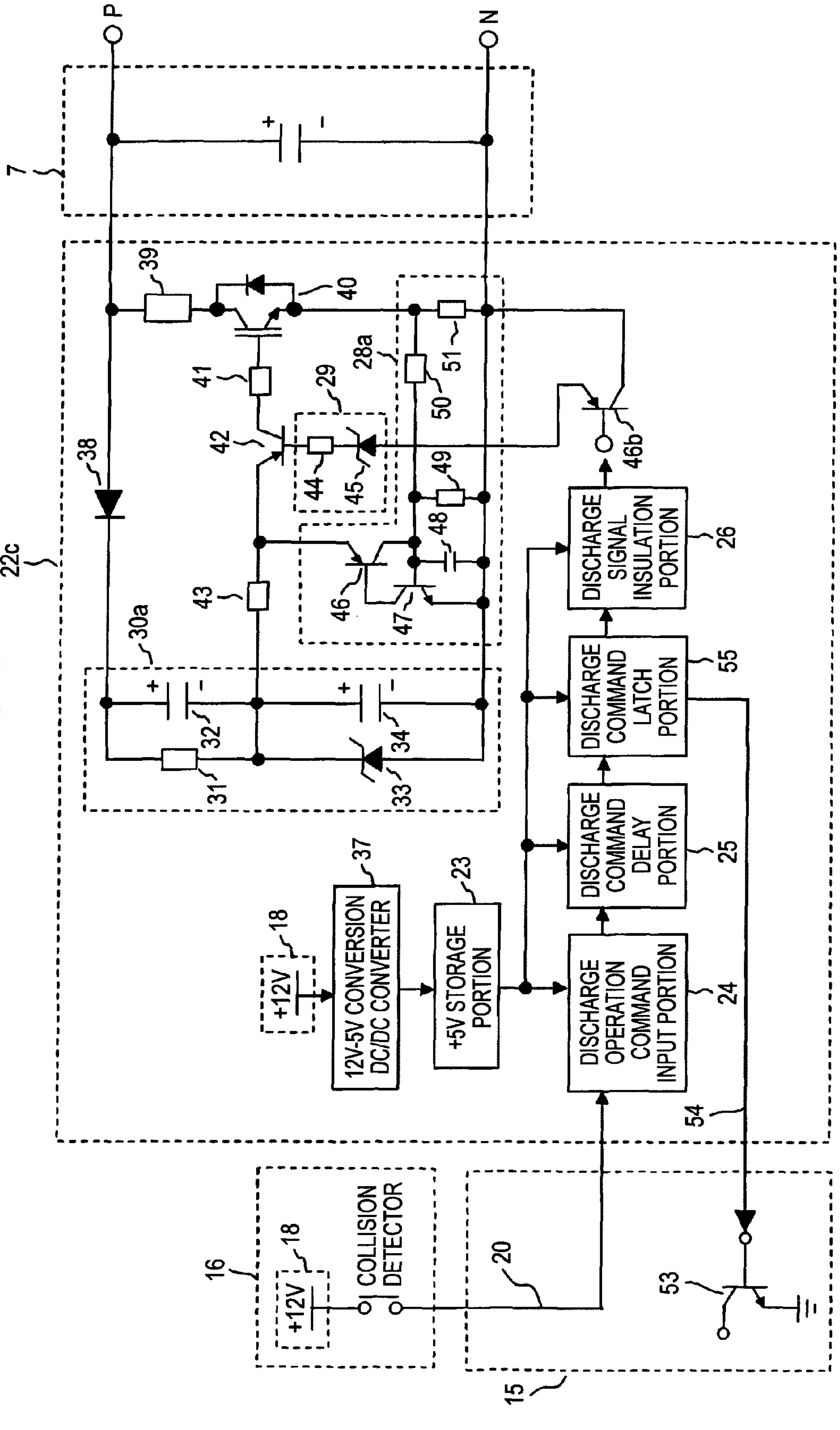
FIG. 8 is a diagram illustrating the details of a forced discharge circuit portion 22*c* according to Embodiment 3 of the invention.

FIG. 8 is a diagram illustrating the details of a forced discharge circuit portion 22*c* according to Embodiment 3 of the invention.

The differences between the forced discharge circuit portion 22*b* illustrated in FIG. 2 and the forced discharge circuit portion 22*c* according to Embodiment 2 are as follows.

1) As illustrated in FIG. 8, the discharge command latch portion 55 is added. A discharge state signal (FD3) 54 output from the discharge command latch portion 55 is connected to the base of the grounded-emitter transistor 53 for monitoring the discharge state of the vehicle control controller 15.
2) The discharge signal latch circuit portion 27 illustrated in FIG. 2 is replaced with the PNP transistor 46*b*. The resistor 35 and the NPN transistor 52 illustrated in FIG. 2 are eliminated.

Hereinafter, the functional block portion relating to the aforementioned differences and the circuit configuration thereof are described.

Referring to FIG. 8, when a discharge signal (FD1) 20 serving as a collision detection signal is input to the discharge command latch portion 55 through the discharging operation command input portion 24 and the discharge command delay portion 25, the discharge command latch portion 55 outputs the discharge signal to the discharge signal insulation portion 26 as a discharge latch signal. In addition, a discharge state signal (FD3) 54 is output. The present embodiment is configured such that the latch function of the discharge signal latch circuit portion 27 illustrated in FIG. 2 is transferred to the discharge command latch portion 55, and that the PNP transistor 46*b* is driven by an output of the discharge signal insulation portion 24.

Next, an operation of monitoring discharge performed by a forced discharge circuit portion 22*c* is described hereinafter with reference to FIG. 8.

<Discharge Monitoring Operation Performed by Forced Discharge Circuit Portion 22*c*>

<<Start of Discharge Operation>>

Discharge operation signals from the discharge operation command input portion 24 and the discharge command delay portion 25 are maintained (a latch operation is performed) by the discharge command latch portion 55. The discharge latch signal is converted by the discharge signal insulation portion 26 into an insulation signal having a Low level. Thus, the PNP transistor 46*b* is turned on. As a result of this operation, the gate drive PNP transistor 42 for driving the gate of the power MOSFET 40 is turned on. Then, the power MOSFET 40 is turned on. Thus, an operation of discharging the main circuit capacitor 7 is performed via the discharge resistor 39.

<<Stoppage of Discharge Operation>>

Simultaneously with the latch operation by the discharge command latch portion 55, the low-voltage battery 18 is disconnected. The potential of the +5V storage portion 23 is gradually lowered to 0V. Thus, the latch state is canceled. When the latch state is canceled, and the discharge command signal is eliminated, the PNP transistor 46*b* is turned off so as to interrupt the gate voltage of the power MOSFET 40. Thus, the discharge operation is stopped.

<<Monitoring of Discharge Operation>>

The signal latched by the discharge command latch portion 55 is synchronized with the discharge operation of the forced discharge circuit portion 22*c*. The latch signal of the discharge command latch portion 55 is output to the grounded-emitter transistor 53 for monitoring the discharge state of the vehicle control controller 15 as the discharge state signal (FD3) 54. Thus, the discharge state can be monitored.

[Embodiment 4]

Figure 9:
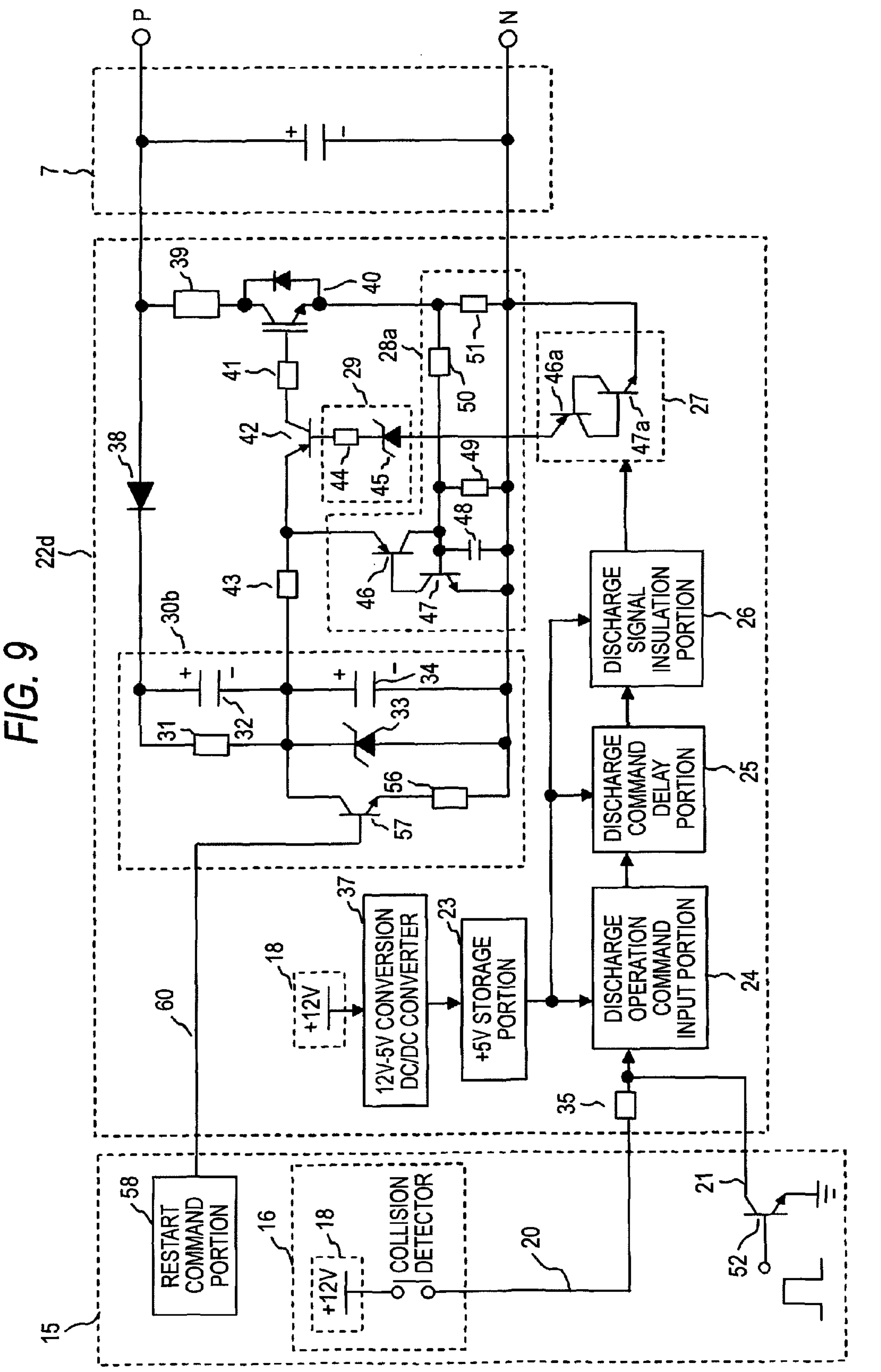
FIG. 9 is a diagram illustrating the details of a forced discharge circuit portion 22*d* according to Embodiment 4 of the invention.

FIG. 9 is a diagram illustrating the details of a forced discharge circuit portion 22*d* according to Embodiment 4 of the invention.

<Differences Between Forced Discharge Circuit Portion According to Embodiment 4 and that According to Embodiment 2>

Differences between the forced discharge circuit portion 22*d* according to Embodiment 4 and the forced discharge circuit portion 22*b* illustrated in FIG. 2 according to Embodiment 2 are as follows.

Referring to FIG. 9, the collector of a discharge restart transistor 57 is connected to the high-voltage-side electrode of the gate power supply electrolytic capacitor 34. The emitter of the discharge restart transistor 57 is connected to the low-voltage-side electrode of the gate power supply electrolytic capacitor 34 via a discharge restart resistor 56. A discharge restart signal 60 output from a restart command portion 58 of the vehicle control controller 15 is input to the base of the discharge restart transistor 57.

<Discharge Restart Operation of Forced Discharge Circuit Portion 22*d* According to Embodiment 4>

Next, a discharge restart operation of a forced discharge circuit portion 22*d* is described hereinafter with reference to FIG. 9.

In a case where a high voltage is applied again thereto just upon completion of a discharge operation, the voltage of the electrolytic capacitor 34 of the gate power supply circuit portion 30*b* is set to be equal to or higher than the zener voltage of the zener diode 45 which provides the base reference voltage of the gate drive PNP transistor 42. Accordingly, the maintained state of the discharge signal of the discharge signal latch circuit portion 27 is not canceled. When a high voltage is applied again to the forced discharge circuit portion 22*d* in this state, the discharge operation is continued, because the power MOSFET 40 is put into an on-state. When the discharge operation is continued while the high-voltage applied state is maintained, the discharge resistor overheat protection circuit portion 28*a* operates and is put into a discharge stopped state (protection latch state).

Upon completion of the discharge operation, the voltage developed across the electrolytic capacitor 34 of the gate power supply circuit portion 30*b* is set at 0V just before the high-voltage is applied to the forced discharge circuit portion 22*d*, the voltage developed across the electrolytic capacitor 34 is equal to or lower than the zener voltage of the zener diode 45, which is the base voltage of the PNP transistor 42. Thus, there is no current supplied to the discharge signal latch circuit portion 27. Consequently, the discharge signal latched state is canceled. Therefore, when the high-voltage is applied again to the forced discharge circuit portion 22*d*, the discharge circuit portion is not in the discharge operation state. Accordingly, the discharge resistor overheat protection circuit portion 28 does not operate. A start-up operation is normally performed.

The discharge restart signal 60 output from the restart command portion 58 of the vehicle control controller 15 is input to the discharge restart transistor 57 of the forced discharge circuit portion 22*d* just upon completion of the discharge operation. Thus, the discharge restart transistor 57 is turned on. Then, the voltage of the gate power supply electrolytic capacitor 34 is discharged by the discharge restart resistor 56 and reduced to 0V. The current supplied to the discharge signal latch circuit portion 27 is eliminated by this operation. Thus, the discharge signal latched state is canceled. Then, the discharge operation is stopped. Subsequently, the discharge restart signal 60 is canceled therefrom. Then, the high voltage is applied thereto, so that a start-up operation is normally performed. Just upon completion of the discharge operation, an operation of normally performing restart by applying the high voltage thereto just upon completion of the discharge operation can be implemented.

[Embodiment 5]

<Difference Between Forced Discharge Circuit Portion According to Embodiment 5 and that According to Embodiment 4>

Figure 10:
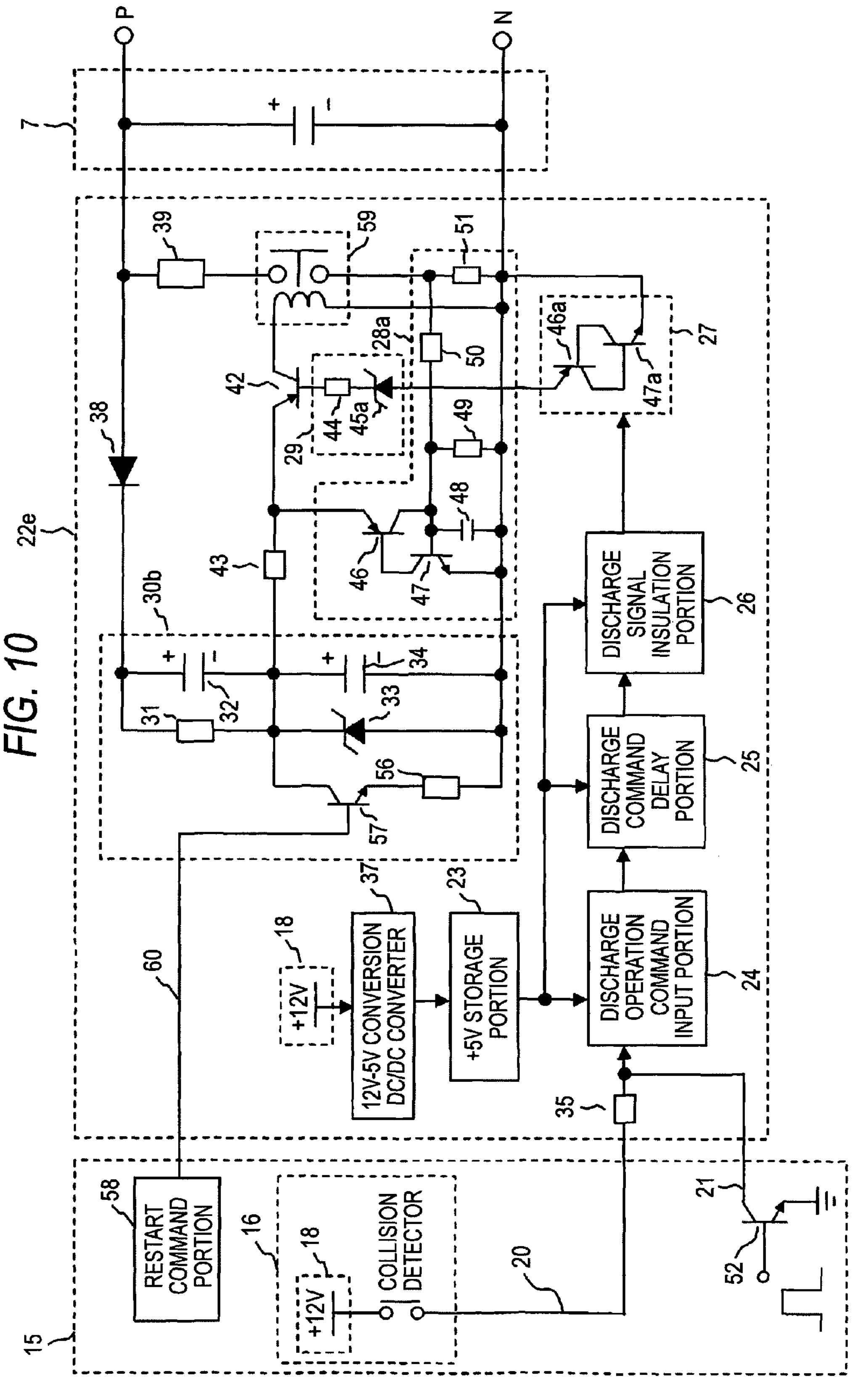
FIG. 10 is a diagram illustrating the details of a forced discharge circuit portion 22*e* according to Embodiment 5 of the invention.
Figure 11:
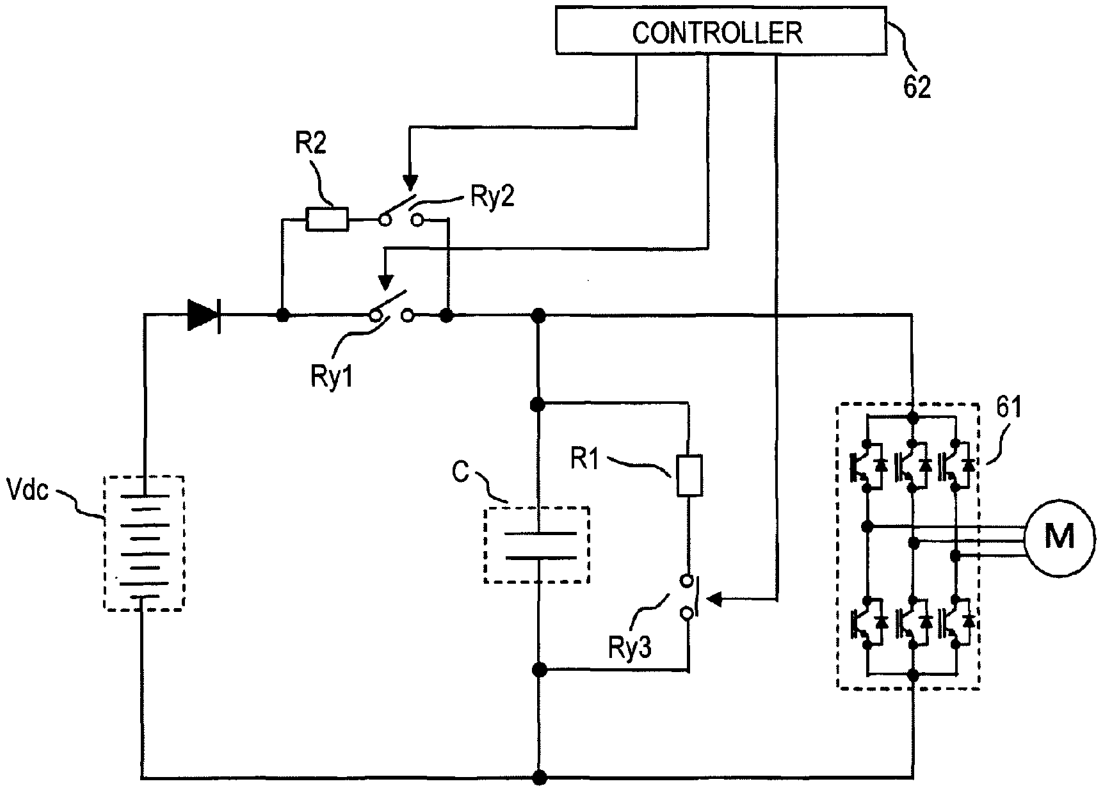
FIG. 11 is a diagram illustrating a discharge circuit in an electric motor drive apparatus according to Conventional Example 1.
Figure 12:
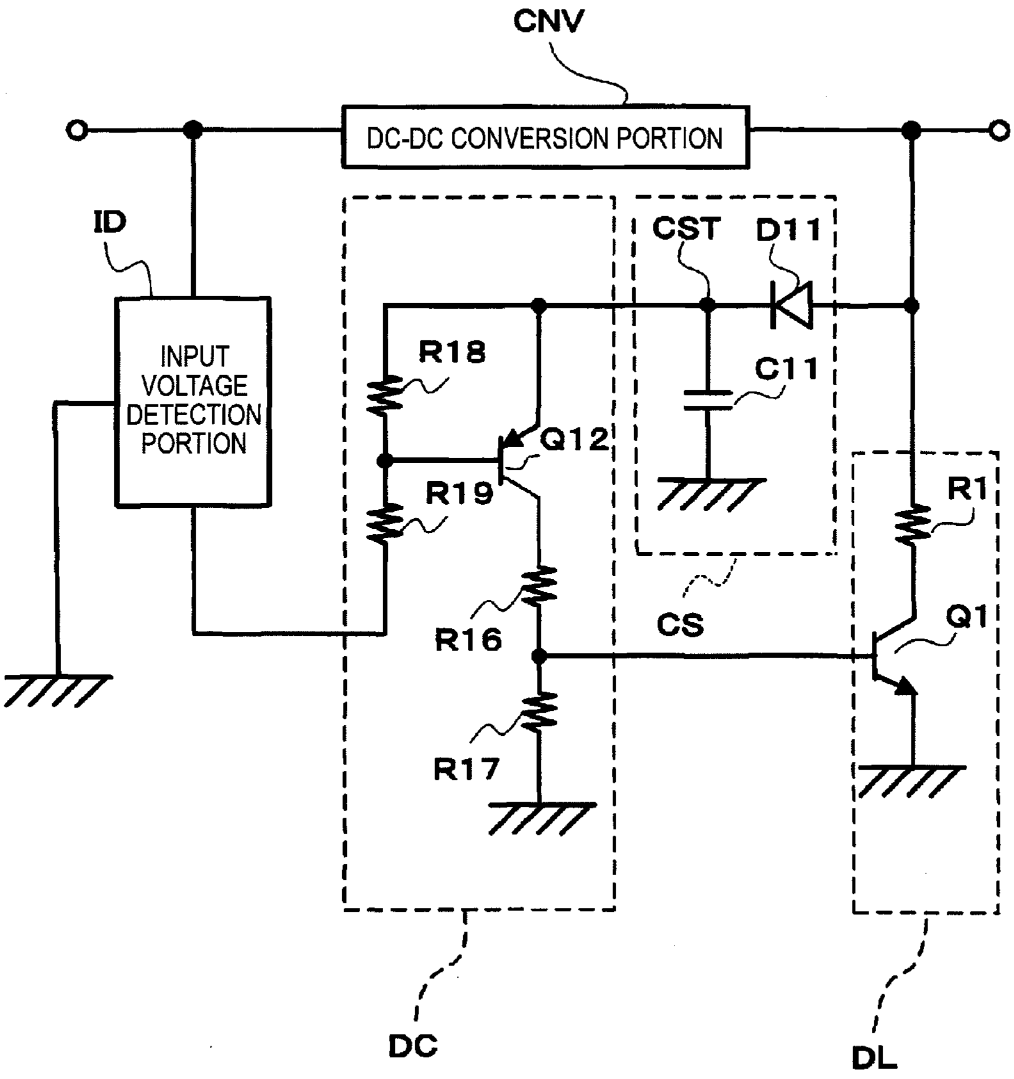
FIG. 12 is a diagram illustrating a discharge circuit in a power supply circuit according to Conventional Example 2.
Figure 13:
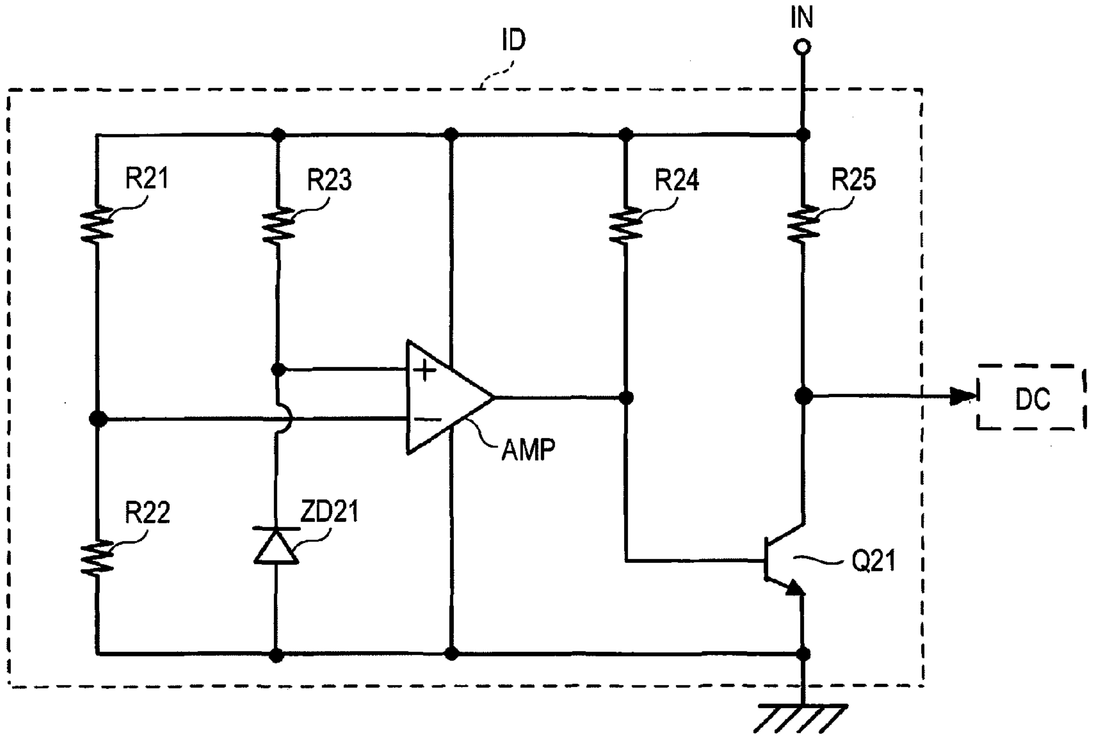
FIG. 13 is a circuit diagram illustrating an input voltage detection circuit ID illustrated in FIG. 12.
Figure 14:
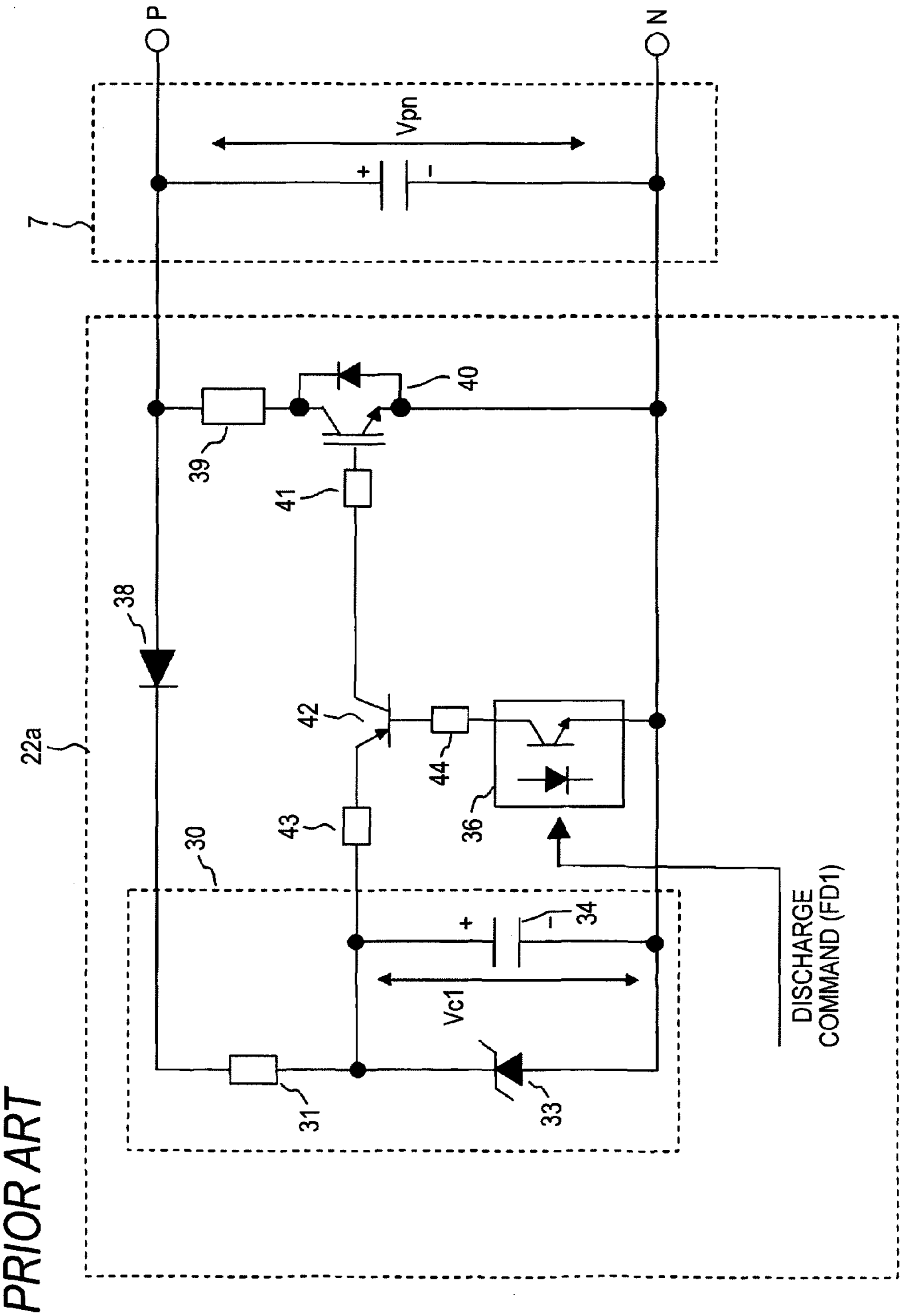
FIG. 14 is a circuit diagram illustrating a discharge circuit according to Conventional Example 3 provided with a gate power supply circuit portion 30 which generates a gate drive voltage from a high voltage.
Figure 15:
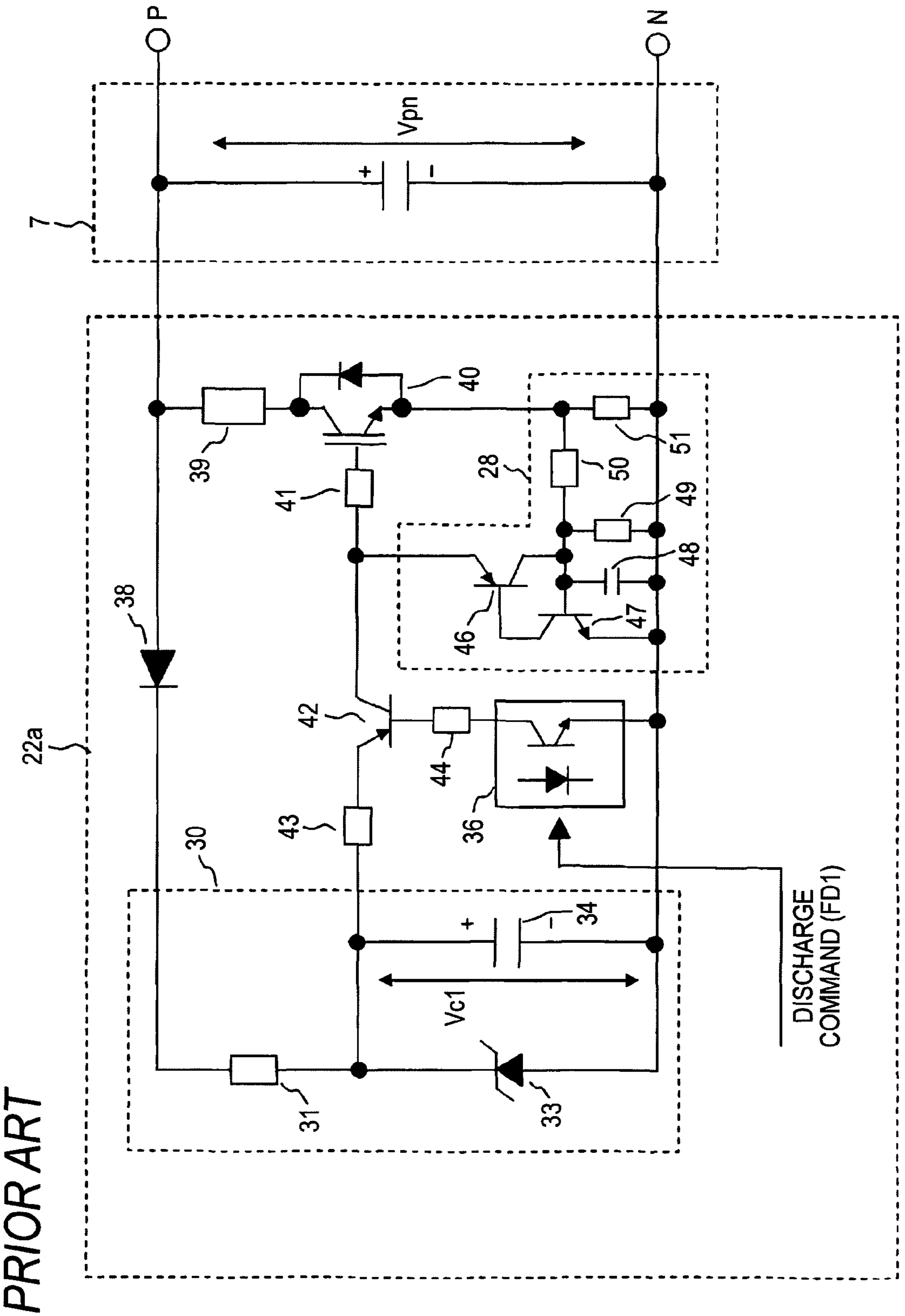
FIG. 15 is a diagram illustrating a discharge circuit according to Conventional Example 4 configured by adding the discharge resistor overheat protection circuit portion 28 to the discharge circuit illustrated in FIG. 14.

FIG. 10 is a diagram illustrating the details of a forced discharge circuit portion 22*e* according to Embodiment 5 of the invention. The difference between the forced discharge circuit portion 22*e* according to Embodiment 5 and the forced discharge circuit portion 22*d* illustrated in FIG. 9 according to Embodiment 4 is that the power MOSFET 40 illustrated in FIG. 9 is replaced with a discharge relay 59. The collector of the gate drive PNP transistor 42 is connected to the excitation winding input terminal of the discharge relay 59. The other excitation winding input terminal thereof is connected to the line at the side of the terminal N in the forced discharge circuit portion 22*e*.

The discharge resistor 39 is connected to one of the contact portions of the discharge relay 59. The discharge current detection resistor 51 of the discharge resistor overheat protection circuit portion 28*a* is connected to the other contact portion of the discharge relay 59.

<Operation of Forced Discharge Circuit Portion 22*e* According to Embodiment 5>

Next, an operation of a forced discharge circuit portion 22*e* is described hereinafter with reference to FIG. 10.

The gate drive PNP transistor 42 is used as an excitation winding drive transistor for the discharge relay 59. The zener voltage of the zener diode 45*a*, which is the base voltage of the PNP transistor 42, is set to be a voltage equal to or higher than a working voltage of the discharge relay 59. Even when the power MOSFET 40 (see FIG. 9) is replaced with the discharge relay 59, the protection of the discharge resistor 39 from overheat can be protected by installing the discharge resistor overheat protection circuit portion 28*a*, similarly to the aforementioned embodiment.

Similarly, the apparatus can instantly be started up by installing the gate power supply circuit portion 30*b*. Upon completion of the discharge operation, even when the high voltage is applied again to the forced discharge circuit portion 22*e*, the voltage of the electrolytic capacitor 34 of the gate drive circuit portion 30*b* is set at a value, which is equal to or higher than the zener voltage of the zener diode 45*a* which provides the base reference voltage of the gate drive PNP transistor 42, in order to maintain discharge. Accordingly, the discharge signal maintaining state of the discharge signal latch circuit portion 27 is not canceled. When the high voltage is applied again to the forced discharge circuit portion 22*e* in this state, the discharge operation is continued, because the discharge relay 59 is in an on-state. When the discharge operation is continued while the high-voltage applied state is maintained, the discharge resistor overheat protection circuit portion 28*a* operates and is brought into a discharge stopped state (protection latch state).

Upon completion of the discharge operation, the voltage of the electrolytic capacitor 34 of the gate power supply circuit portion 30*b* is set to be 0V just before the high voltage is applied again to the forced discharge circuit portion 22*e*. Thus, the voltage of the gate power supply circuit portion 30*b* is equal to or lower than the voltage of the zener diode 45*a*, which is the base voltage of the PNP transistor 42, so that the current supplied to the discharge signal latch circuit portion 27 is eliminated, and that the discharge signal latch state is canceled.

When the high voltage is applied again to the forced discharge circuit portion 22*e*, the discharge resistor overheat protection circuit portion 28*a* does not operate, because the apparatus is not in the discharge operation state. Consequently, a start-up operation is normally performed.

The discharge restart signal 60 output from the restart command portion 58 of the vehicle control controller 15 is input to the discharge restart transistor 57 of the forced discharge circuit portion 22*e* just upon completion of the discharge operation. Then, the discharge restart transistor 57 is turned on. Thus, the voltage of the gate power supply electrolytic capacitor 34 is discharged by the discharge restart resistor 56 and reduced to 0V. The current supplied to the discharge signal latch circuit portion 27 is eliminated by this operation. Then, the discharge signal latch state is canceled. The discharge operation is stopped.

Subsequently, the discharge restart signal 60 is canceled, and the high voltage is applied. Then, a start-up operation is normally performed. Similarly to the aforementioned embodiment, a normal restart operation can be implemented by applying a high voltage just upon completion of the discharge operation.

The invention is accomplished by being assumed to be applied to an inverter apparatus to be mounted in an electric vehicle. Particularly, the inverter apparatus according to the invention can be applied to an electric car, a hybrid car or the like as an inverter apparatus having a forced discharge circuit portion for preventing occurrence of short-circuit, overheat, and the like due to the contact between a high-voltage portion and a broken power line or metal piece when an collision accident occurs.

What is claimed is:

1. An electric vehicle inverter apparatus comprising:

an inverter portion configured to drive an AC electric motor mechanically connected to a vehicle drive portion of an electric vehicle;

a converter portion configured to convert electric power generated by an AC electric generator which generates electric power by an engine driving force of the electric vehicle into a direct-current voltage within predetermined range of voltages;

an inverter controller configured to control the inverter portion and the converter portion;

a main circuit capacitor connected between DC bus of the inverter and the converter; and a forced discharge circuit portion configured to discharge electric charges charged into the main circuit capacitor in response to a discharge command signal, direct-current electric power for the inverter portion being supplied from a high-voltage battery unit which includes an inverter main circuit connection switch, a high-voltage battery and an inrush current suppression circuit configured to suppress an inrush current from the high-voltage battery when the inverter main circuit connection switch is thrown and which is connected to the DC bus, control power being supplied from a low-voltage battery unit which includes a low-voltage battery and a switch configured to open and close the low-voltage battery, the electric vehicle inverter apparatus receiving and being controlled according to both of a control signal from a vehicle control controller configured to supervisingly control the electric vehicle and a control signal from a collision detector which is connected between the vehicle control controller and the low-voltage battery and which includes a switch configured to be put into an open state when detecting impact due to a collision of the electric vehicle, wherein the vehicle control controller detects an open signal indicating that a switch of the collision detector is opened when the collision detector is operated by the collision of the electric vehicle;

the vehicle control controller brings the inverter main circuit connection switch of the high-voltage battery unit into an open state, interrupts supply of direct-current electric power of the high-voltage battery to the DC bus portions and outputs a discharge command signal to the forced discharge circuit portion; and the forced discharge circuit portion discharges electric charges charged into the main circuit capacitor.

2. The electric vehicle inverter apparatus as in claim 1, wherein the forced discharge circuit portion comprises:

a discharge circuit portion including a discharge resistor, a power semiconductor element, and a discharge current detection resistor, which are series-connected between the DC bus;

a discharge resistor overheat protection circuit portion configured to operate by receiving a voltage generated by voltage drop due to discharge current flowing through the discharge current detection resistor as an input thereto;

a gate power supply circuit portion configured to generate drive power for the power semiconductor element from a direct-current voltage between the DC bus;

a drive circuit portion configured to give a drive signal to a control terminal of the power semiconductor element; and a discharge signal latch circuit portion configured to receive a discharge command signal according to a detection signal from the collision detector and to give a drive signal to the drive circuit portion;

when receiving a discharge command signal according to a detection signal from the collision detector, the discharge signal latch circuit portion maintains an on-signal to the drive circuit portion so that the discharge circuit portion can constantly maintain a discharge operation on-state; and when a terminal voltage of the main circuit capacitor is lowered to a value close to 0 volt by a discharge operation, and when a power supply voltage of the gate power supply circuit portion is lowered to a value which is equal to or lower than an operable voltage of the drive circuit portion, the discharge operation on-state is cancelled.

3. The electric vehicle inverter apparatus as in claim 2, wherein the gate power supply circuit portion comprises a resistor and a zener diode series-connected via a diode between the DC bus, and electrolytic capacitors series-connected to each other and parallel-connected to the resistor and the zener diode, respectively; and a zener voltage of the zener diode is higher than an operable voltage of the drive circuit portion, and equal to and lower than an allowable gate voltage of the power semiconductor element.

4. The electric vehicle inverter apparatus as in claim 3, wherein the gate power supply circuit portion is configured so that a discharge restart transistor and a discharge restart resistor series-connected to each other are parallel-connected to the zener diode and the electrolytic capacitor parallel-connected to each other; and when receiving a discharge restart signal from a restart command portion of the vehicle control controller just upon completion of a discharge operation, the gate power supply circuit portion turns on the discharge restart transistor and discharges charges charged into the electrolyte capacity.

5. The electric vehicle inverter apparatus as in claim 2, wherein a power semiconductor element of the discharge circuit portion includes a MOSFET or an IGBT.

6. The electric vehicle inverter apparatus as in claim 2, wherein the drive circuit portion comprises:

a first gate resistor connected to a gate of the power semiconductor element including a MOSFET or an IGBT;

a first PNP transistor and a second gate resistor series-connected to the first gate resistor; and a third resistor and a zener diode series-connected to a base of the first PNP transistor;

the discharge signal latch circuit portion is provided at the side of an anode of the zener diode; and the discharge signal latch circuit portion comprises an NPN transistor and a PNP transistor, which are connected together as a thyristor.

7. The electric vehicle inverter apparatus as in claim 6, wherein the discharge signal latch circuit portion is configured so that an emitter of a single PNP transistor is connected to an anode of the zener diode of the drive circuit portion;

the discharge signal latch circuit portion does not have a function of latching a discharge command signal; and the discharge signal latch circuit portion is configured to receive a discharge command signal preliminarily latched and to cause the drive circuit portion to operate.

8. The electric vehicle inverter apparatus as in claim 2, wherein the discharge resistor overheat protection circuit portion introduces a terminal voltage of the discharge current detection resistor of the discharge circuit portion to a base of an NPN transistor via a resistor;

a capacitor and a resistor are parallel-connected to each other between a base-emitter junction of the NPN transistor;

a base of a PNP transistor is connected to a collector of the NPN transistor;

a collector of the PNP transistor is connected to a base of the NPN transistor; and an emitter of the PNP transistor is connected to a connection point between the second gate resistor of the drive circuit portion and an emitter of the first PNP transistor.

9. The electric vehicle inverter apparatus as in claim 2, wherein the power semiconductor element of the discharge circuit portion is replaced with a discharge relay;

an excitation winding of the discharging relay is exited by the drive circuit portion;

one of contacts of the discharge relay is connected to the discharge resistor; and the other contact of the discharge relay is connected to the discharge current detection resistor.

10. The electric vehicle inverter apparatus as in claim 1, wherein the forced discharge circuit portion comprises:

a DC-DC converter configured to convert a battery voltage supplied from the low-voltage battery into an operating voltage of a control circuit portion;

a storage portion configured to store an output voltage of the DC-DC converter;

a discharge operation command input portion configured to input a detection signal from the collision detector and a discharge signal from the vehicle control controller;

a discharge command delay portion configured to prevent occurrence of chattering of the signal input to the discharge operation command input portion;

a discharge signal insulation portion configured to electrically insulate an output signal from the discharge command delay portion; and the storage portion has storage capacity sufficient to an extent that a voltage drop due to interruption of a voltage supplied from the low-voltage battery unit can slightly be delayed on collision of the electric vehicle, and can maintain a power supply voltage at which a control circuit portion is operable until a discharge operation of the forced discharge circuit portion is started up.

11. The electric vehicle inverter apparatus as in claim 10, wherein the forced discharge circuit portion is configured so that a discharge command latch portion is provided between the discharge command delay portion and the discharge signal insulation portion and maintains a discharge command signal; and the forced discharge circuit portion outputs a discharge state monitoring signal to a vehicle control controller.

12. A protection method for an electric vehicle inverter apparatus, the electric vehicle inverter apparatus comprising:

an inverter portion configured to drive an AC electric motor mechanically connected to a vehicle drive portion of an electric vehicle;

a converter portion configured to convert electric power generated by an AC electric generator which generates electric power by an engine driving force of the electric vehicle into a direct-current voltage within predetermined range of voltages;

an inverter controller configured to control the inverter portion and the converter portion;

a main circuit capacitor connected between DC bus of the inverter and the converter; and a forced discharge circuit portion configured to discharge electric charges charged into the main circuit capacitor in response to a discharge command signal, direct-current electric power for the inverter portion being supplied from a high-voltage battery unit which includes an inverter main circuit connection switch, a high-voltage battery and an inrush current suppression circuit configured to suppress an inrush current from the high-voltage battery when the inverter main circuit connection switch is thrown and which is connected to the DC bus, control power being supplied from a low-voltage battery unit which includes a low-voltage battery and a switch configured to open and close the low-voltage battery, the electric vehicle inverter apparatus receiving and being controlled according to both of a control signal from a vehicle control controller configured to supervisingly control the electric vehicle and a control signal from a collision detector which is connected between the vehicle control controller and the low-voltage battery and which includes a switch configured to be put into an open state when detecting impact due to a collision of the electric vehicle, the protection method comprising:

detecting, by the vehicle control controller, an open signal indicating that a switch of the collision detector is opened when the collision detector is operated by the collision of the electric vehicle;

bringing, by the vehicle control controller, the inverter main circuit connection switch of the high-voltage battery unit into an open state, interrupting, by the vehicle control controller, supply of direct-current electric power of the high-voltage battery to the DC bus portions, outputting, by the vehicle control controller, a discharge command signal to the forced discharge circuit portion; and discharging, by the forced discharge circuit portion, electric charges charged into the main circuit capacitor.

13. The protection method for an electric vehicle inverter apparatus as in claim 12, wherein the forced discharge circuit portion comprises:

a discharge circuit portion including a discharge resistor, a power semiconductor element, and a discharge current detection resistor, which are series-connected between the DC bus;

a discharge resistor overheat protection circuit portion configured to operate by receiving a voltage generated by voltage drop due to discharge current flowing through the discharge current detection resistor as an input thereto;

a gate power supply circuit portion configured to generate drive power for the power semiconductor element from a direct-current voltage between the DC bus;

a drive circuit portion configured to give a drive signal to a control terminal of the power semiconductor element; and a discharge signal latch circuit portion configured to receive a discharge command signal according to a detection signal from the collision detector and to give a drive signal to the drive circuit portion;

when receiving a discharge command signal according to a detection signal from the collision detector, the discharge signal latch circuit portion maintains an on-signal to the drive circuit portion so that the discharge circuit portion can constantly maintain a discharge operation on-state; and when a terminal voltage of the main circuit capacitor is lowered to a value close to 0 volt by a discharge operation, and when a power supply voltage of the gate power supply circuit portion is lowered to a value which is equal to or lower than an operable voltage of the drive circuit portion, the discharge operation on-state is canceled.

14. The protection method for an electric vehicle inverter apparatus as in claim 13, wherein the gate power supply circuit portion comprises a resistor and a zener diode series-connected via a diode between the DC bus, and electrolytic capacitors series-connected to each other and parallel-connected to the resistor and the zener diode, respectively; and a zener voltage of the zener diode is higher than an operable voltage of the drive circuit portion, and equal to and lower than an allowable gate voltage of the power semiconductor element.

15. The protection method for an electric vehicle inverter apparatus as in claim 14, wherein the gate power supply circuit portion is configured so that a discharge restart transistor and a discharge restart resistor series-connected to each other are parallel-connected to the zener diode and the electrolytic capacitor parallel-connected to each other; and when receiving a discharge restart signal from a restart command portion of the vehicle control controller just upon completion of a discharge operation, the gate power supply circuit portion turns on the discharge restart transistor and discharges charges charged into the electrolyte capacity.

16. The protection method for an electric vehicle inverter apparatus as in claim 12, wherein the forced discharge circuit portion comprises:

a DC-DC converter configured to convert a battery voltage supplied from the low-voltage battery into an operating voltage of a control circuit portion;

a storage portion configured to store an output voltage of the DC-DC converter;

a discharge operation command input portion configured to input a detection signal from the collision detector and a discharge signal from the vehicle control controller;

a discharge command delay portion configured to prevent occurrence of chattering of the signal input to the discharge operation command input portion;

a discharge signal insulation portion configured to electrically insulate an output signal from the discharge command delay portion; and the storage portion has storage capacity sufficient to an extent that a voltage drop due to interruption of a voltage supplied from the low-voltage battery unit can slightly be delayed on collision of the electric vehicle, and can maintain a power supply voltage at which a control circuit portion is operable until a discharge operation of the forced discharge circuit portion is started up.

17. The protection method for an electric vehicle inverter apparatus as in claim 16, wherein the forced discharge circuit portion is configured so that a discharge command latch portion is provided between the discharge command delay portion and the discharge signal insulation portion and maintains a discharge command signal; and the forced discharge circuit portion outputs a discharge state monitoring signal to a vehicle control controller.

* * * * *